(12) United States Patent
Nomura et al.

(10) Patent No.: US 7,539,996 B2
(45) Date of Patent: May 26, 2009

(54) COMPUTER PROGRAM AND METHOD FOR SUPPORTING IMPLEMENTATION OF SERVICES ON MULTIPLE-SERVER SYSTEM

(75) Inventors: Yoshihide Nomura, Kawasaki (JP); Tsuyoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 11/386,948

(22) Filed: Mar. 23, 2006

(65) Prior Publication Data

US 2007/0101272 A1    May 3, 2007

(30) Foreign Application Priority Data

Oct. 31, 2005    (JP) ............... 2005-317592

(51) Int. Cl.
*G06F 13/00*    (2006.01)

(52) U.S. Cl. .................. 719/313; 719/311; 719/328; 719/330

(58) Field of Classification Search ............... 719/330, 719/311, 313, 328; 707/104
See application file for complete search history.

(56) References Cited

U.S. PATENT DOCUMENTS

| | | | | |
|---|---|---|---|---|
| 6,542,908 | B1 * | 4/2003 | Ims ............... | 707/204 |
| 2004/0268096 | A1 * | 12/2004 | Master et al. ............... | 712/227 |
| 2005/0149206 | A1 * | 7/2005 | Krane ............... | 700/17 |
| 2006/0069717 | A1 * | 3/2006 | Mamou et al. ............... | 709/203 |
| 2006/0074730 | A1 * | 4/2006 | Shukla et al. ............... | 705/8 |
| 2006/0271568 | A1 * | 11/2006 | Balkir et al. ............... | 707/100 |
| 2007/0033570 | A1 * | 2/2007 | Kong ............... | 717/104 |
| 2007/0033582 | A1 * | 2/2007 | Hu et al. ............... | 717/156 |

OTHER PUBLICATIONS

Patent Abstracts of Japan, Publication No. 2001-092647, Published Apr. 6, 2001.

* cited by examiner

*Primary Examiner*—Andy Ho
(74) *Attorney, Agent, or Firm*—Staas & Halsey LLP

(57) ABSTRACT

A computer-readable medium storing a program that can produce execution flows of business-specific services automatically from a given business process model so as to deploy them on a plurality of servers. When a business process model is given, a service interface selector determines which service interface should be used to implement interactions between swimlanes of the business process model. An execution flow generator then creates an execution flow of each individual service defined by the corresponding swimlane and places functional elements of each swimlane in the corresponding execution flow, as well as adding input and output interfaces between different swimlanes according to the service interface chosen by the service interface selector. A service deployment unit then deploys the created execution flows on their corresponding servers.

11 Claims, 37 Drawing Sheets

COMPUTER PROGRAM AND METHOD FOR SUPPORTING IMPLEMENTATION OF SERVICES ON MULTIPLE-SERVER SYSTEM

CROSS-REFERENCE TO RELATED APPLICATIONS

This application is based upon and claims the benefits of priority from the prior Japanese Patent Application No. 2005-317592, filed on Oct. 31, 2005, the entire contents of which are incorporated herein by reference.

BACKGROUND OF THE INVENTION

1. Field of the Invention

The present invention relates to a computer program and method for supporting implementation of business-specific service functions on a computer system. More particularly, the present invention relates to a computer program and method for supporting implementation of service functions on a computer system formed from a plurality of servers.

2. Description of the Related Art

Service Oriented Architecture (SOA) has been of great interest as a methodology for developing business applications. SOA enables a business system to be built as an organized set of reasonably divided business functions, called "services," designed to work together in a cooperative fashion. SOA-based development of a computer system for a specific business purpose begins with describing an overall flow of business activities in a script called a "business process model." The second step is to produce execution flows from that business process model. Execution flows describe in detail what part of processing functions the servers are supposed to provide. The third step is to deploy those execution flows on their corresponding servers, so that the servers will provide intended services according to the execution flows.

Researchers have proposed various techniques for automatically creating execution flows from a given business process model. See, for example, Japanese Patent Application Publication No. 2001-92647. This publication discloses a technique for generating multi-thread parallel processing programs from a business process script defining a specific business process. However, a difficulty arises when one applies the proposed technique in implementing a business application on a network of multiple servers. While servers in such a system have to cooperate together, it is not easy to generate cooperative execution flows automatically from a business process model.

One reason for the difficulty in creating execution flows for a distributed system is that those who build a business process model do not have sufficient knowledge about actual deployment of execution flows in a target system. In other words, process model designers may not always know necessary techniques for system integration. And this lack of knowledge on the part of process designers makes automated service implementation difficult. More specifically, the above-described difficulty comes from the following three gaps between process modeling and execution flow generation:

The first gap lies in the difference in their viewpoints on the system. Generally a business process model is built from a third-party viewpoint, independent of any particular system component. Execution flows, on the other hand, view a system from a more specific viewpoint since they have to describe specific functions that each service provider (i.e., server) is supposed to offer, including how to invoke other related services. In other words, the execution flow generator needs to have more explicit information about each pair of cooperative services. The lack of this information makes it difficult to generate execution flows automatically from a business process model.

The second gap lies in the awareness (or lack thereof) of interactions between services. A business process model describes a sequence of activities without explicitly specifying how the system components are supposed to interact. Execution flows, on the other hand, need to be specific enough in terms of the interface between services and the way of messaging (i.e., synchronous or asynchronous).

The third gap lies in the way of handling asynchronous services. Asynchronous communication between services may not necessarily be apparent in a business process model because it only describes a process flow in a sequential manner. Execution flows may, on the other hand, vary depending on whether the services use synchronous messaging or asynchronous messaging for their interaction, since they have to define how requests and responses are communicated between each pair of services, as well as offering an interface for receiving return values.

Because of the above-described gaps in system design approach, the execution flows produced by a conventional method may not be satisfactory in terms of stability and efficiency of processing, thus failing to provide an optimal system design. While some system integration techniques based on workflow technology (e.g., Enterprise Application Integration (EAI)) have been available, most workflow-based business applications lack the ability of sharing their components with other applications.

Flow definition languages such as Business Process Execution Language (BPEL) enable existing web services to cooperate together, typically by allowing a service to invoke other necessary services. However, it is necessary, in this approach, for each implemented service to have an explicit definition of what functions to delegate and which services to invoke in performing that delegation. The amount of services deployed on each server, as well as selection of service combinations, has to be fine-tuned manually, depending on whether the entire system is managed by a flow engine or by Remote Procedure Call (RPC) facilities.

SUMMARY OF THE INVENTION

In view of the foregoing, it is an object of the present invention to provide a computer program stored in a computer-readable medium, as well as a computer-implemented method, that can produce execution flows of business-specific services automatically from a given business process model so as to deploy them on a plurality of servers.

To accomplish the above object, the present invention provides a computer-readable medium storing a program for supporting implementation of business-specific service functions on a computer system. This program causing a computer to function as a service interface selector and an execution flow generator. The service interface selector determines which service interface should be used to implement interactions between swimlanes representing individual services constituting a given business process model. The execution flow generator creates an initial version of execution flows corresponding to the individual services each defined by the corresponding swimlanes of the business process model. It then places functional elements of each swimlane in the corresponding execution flow, as well as adding input and output interfaces between different swimlanes according to the service interface chosen by the service interface selector.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
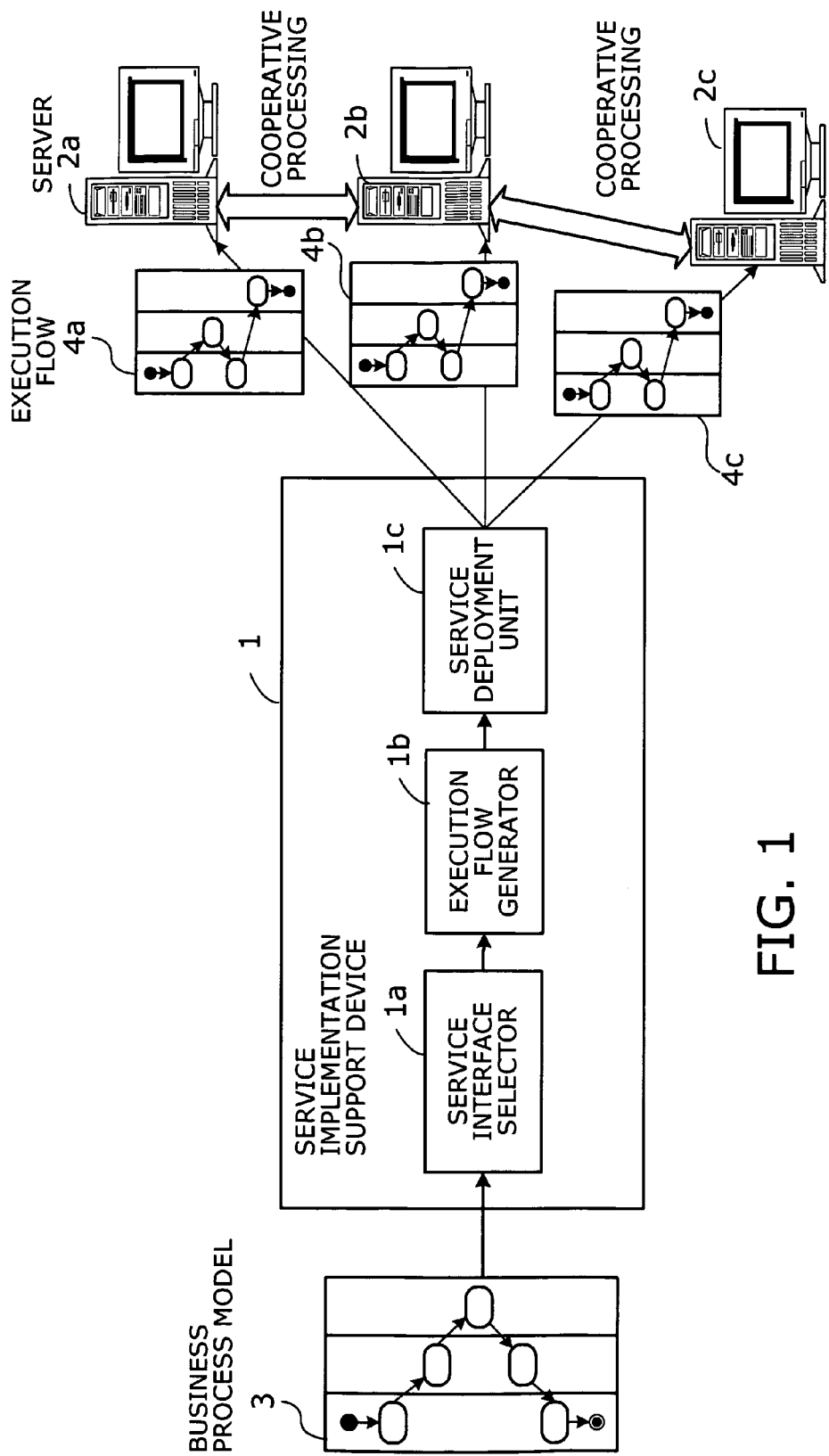
FIG. 1 provides an overview of an embodiment of the invention.

A preferred embodiment of the present invention will be described below with reference to the accompanying drawings, wherein like reference numerals refer to like elements throughout.

FIG. 1 provides an overview of an embodiment of the invention. The illustrated service implementation support device 1 produces execution flows 4a, 4b, and 4c for deployment on servers 2a, 2b, and 2c, respectively, according to a business process model 3. To this end, the service implementation support device 1 has a service interface selector 1a, an execution flow generator 1b, and a service deployment unit 1c. Here the given business process model 3 defines a series of activities that take place in separate services represented in separate swimlanes.

The service interface selector 1a stores a given business process model 3 in a memory, as well as determines which service interface should be used to implement interactions between swimlanes representing individual services constituting the given business process model 3. Specifically, services may use synchronous messaging or asynchronous messaging to communicate with each other, and the service interface selector 1a chooses which way to use to realize cooperative processing of services. Another aspect of service interface is how the services in a business process are invoked. One way is that a single service manages invocation of other services in a centralized manner (referred to as a "centralized management model") Another way is that each service only interacts with its directly dependent services in a business process (referred to as an "individual service model"). The service interface selector 1a thus chooses which way to use to implement cooperation between services.

The execution flow generator 1b creates in the memory an initial version of execution flows 4a, 4b, and 4c corresponding to individual services defined in the swimlanes of the business process model 3. The execution flow generator 1b places functional elements of each swimlane in the corresponding execution flows 4a, 4b, and 4c created on the memory, as well as adding input and output interfaces between different swimlanes according to the service interface chosen by the service interface selector 1a. The service deployment unit 1c deploys the created execution flows 4a, 4b, and 4c on corresponding servers 2a, 2b, and 2c, respectively.

The above service implementation support device 1 operates as follows. When a business process model 3 is given, the service interface selector 1a saves it in a memory and determines which service interface to use in implementing cooperative processing between swimlanes. The execution flow generator 1b creates an initial version of execution flows 4a, 4b, and 4c corresponding to individual services defined in the swimlanes of the business process model 3. For each of those execution flows 4a, 4b, and 4c created in the memory, the execution flow generator 1b implements the functions of each corresponding swimlane, as well as adding input and output interfaces between different swimlanes according to the service interface chosen by the service interface selector 1a. The service deployment unit 1c then deploys the completed execution flows 4a, 4b, and 4c on their corresponding servers.

As can be seen from the above, the present embodiment creates function-specific execution flows 4a, 4b, and 4c automatically from a given business process model 3 and deploys them on the servers 2a, 2b, and 2c with matched input and output interfaces, so that the servers can provide the intended services by communicating correctly with each other.

The service interface selector 1a may be configured to accept commands from a system administrator when it determines which service interface to use. A default service interface may also be specified beforehand for use in the case where no such instructions are provided by the administrator. The service interface selector 1a may also be designed to determine a service interface for each combination of directly dependent services, rather than applying the same service interface model to all service interactions.

Figure 2:
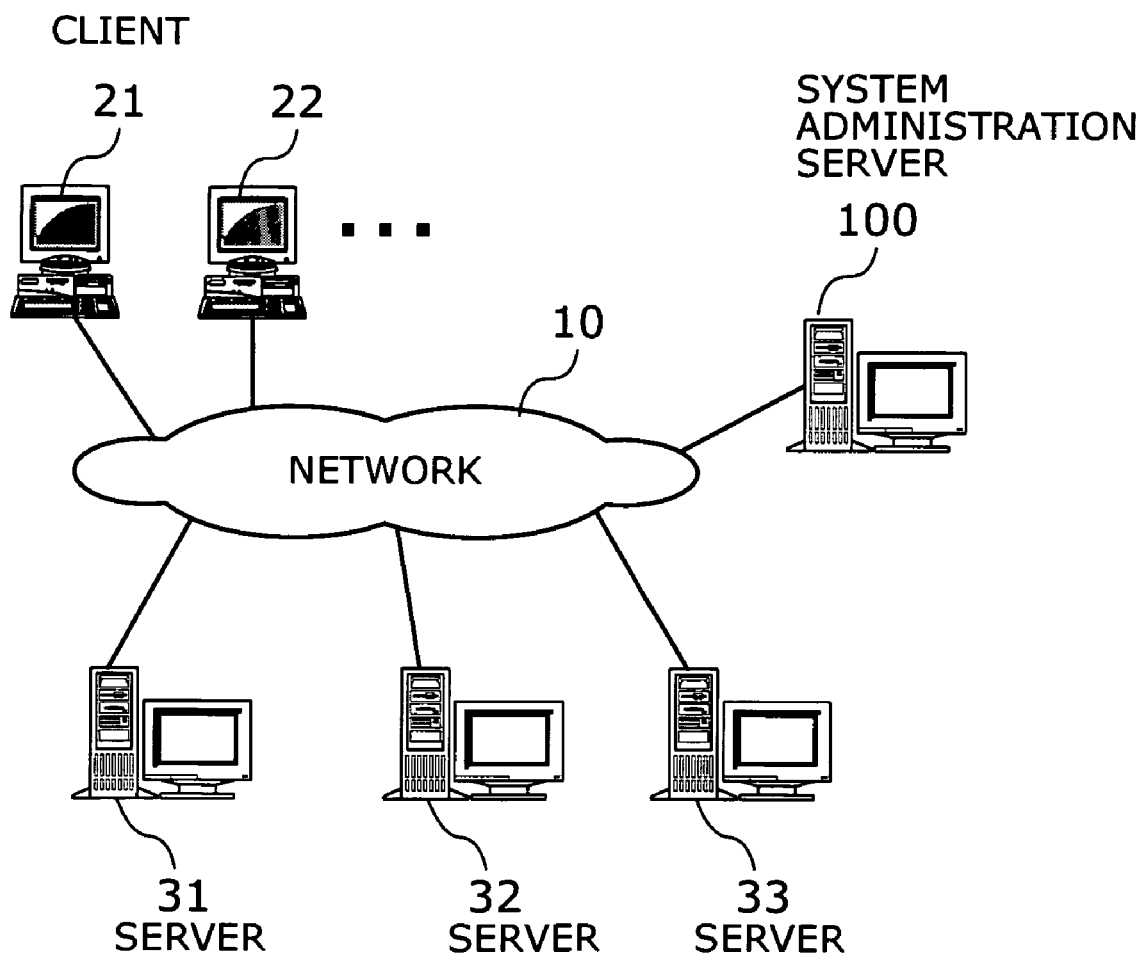
FIG. 2 is a block diagram of a system according to the present embodiment.

Referring now to FIG. 2 and subsequent diagrams, a specific embodiment of the present invention will now be described in detail. FIG. 2 is a block diagram of a system according to the present embodiment. The illustrated system administration server 100 is connected to clients 21, 22, and so on and servers 31, 32, and 33 via a network 10.

The clients 21, 22, and so on are user computers that consume services provided by the servers 31, 32, and 33. The servers 31, 32, and 33 are computers that execute services for realizing a set of business processes. Each single business process is achieved as a combination of services that those servers 31, 32, and 33 execute in a cooperative manner.

The system administration server 100 is a computer that implements an execution flow on each server 31, 32, and 33. More specifically, a system administrator builds a business process model interactively with the system administration server 100. To implement this business process model on a plurality of servers 31, 32, and 33, the system administration server 100 creates and deploys their execution flows. The deployment of execution flows permits the servers 31, 32, and 33 to provide services according to their respective execution flows.

Figure 3:
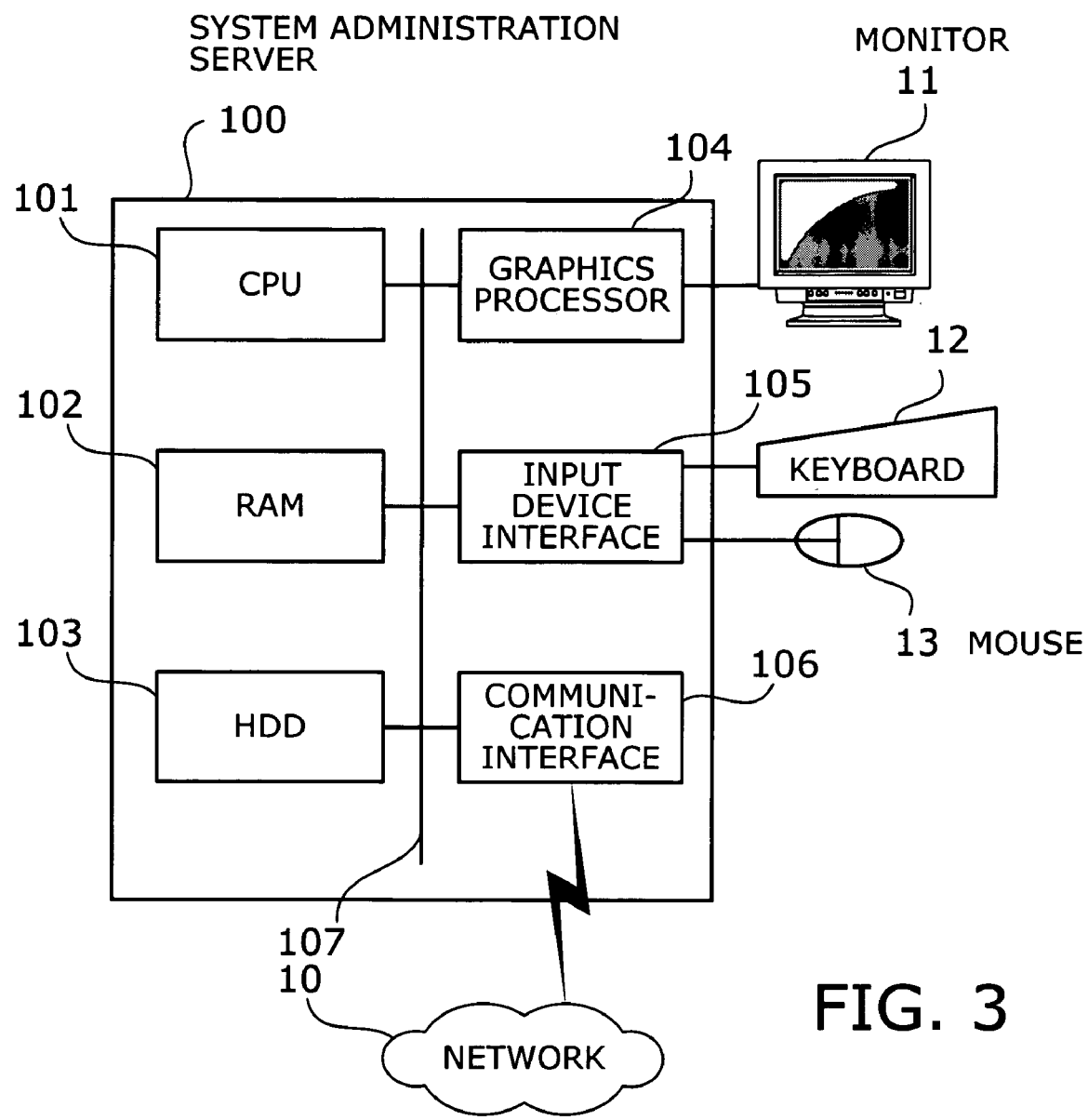
FIG. 3 shows an example hardware configuration of a system administration server of the present embodiment.

FIG. 3 shows an example hardware configuration of the system administration server 100 of the present embodiment. The illustrated system administration server 100 has the following elements: a central processing unit (CPU) 101, a random access memory (RAM) 102, a hard disk drive (HDD) 103, a graphics processor 104, an input device interface 105, and a communication interface 106. The CPU 101 controls the entire system of the system administration server 100, interacting with other elements via a common bus 107.

The RAM 102 serves as temporary storage for the whole or part of operating system (OS) programs and application programs that the CPU 101 executes, in addition to other various data objects manipulated at runtime. The HDD 103 stores program and data files of the operating system and various applications.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to a network 10, allowing the CPU 101 to exchange data with other computers (not shown) on the network 10.

The computer system described above serves as a hardware platform for realizing the processing functions of the present embodiment. While FIG. 3 illustrates a platform for the system administration server 100, the same hardware structure can also be applied to the clients 21, 22, and so on and servers 31, 32, and 33.

Figure 4:
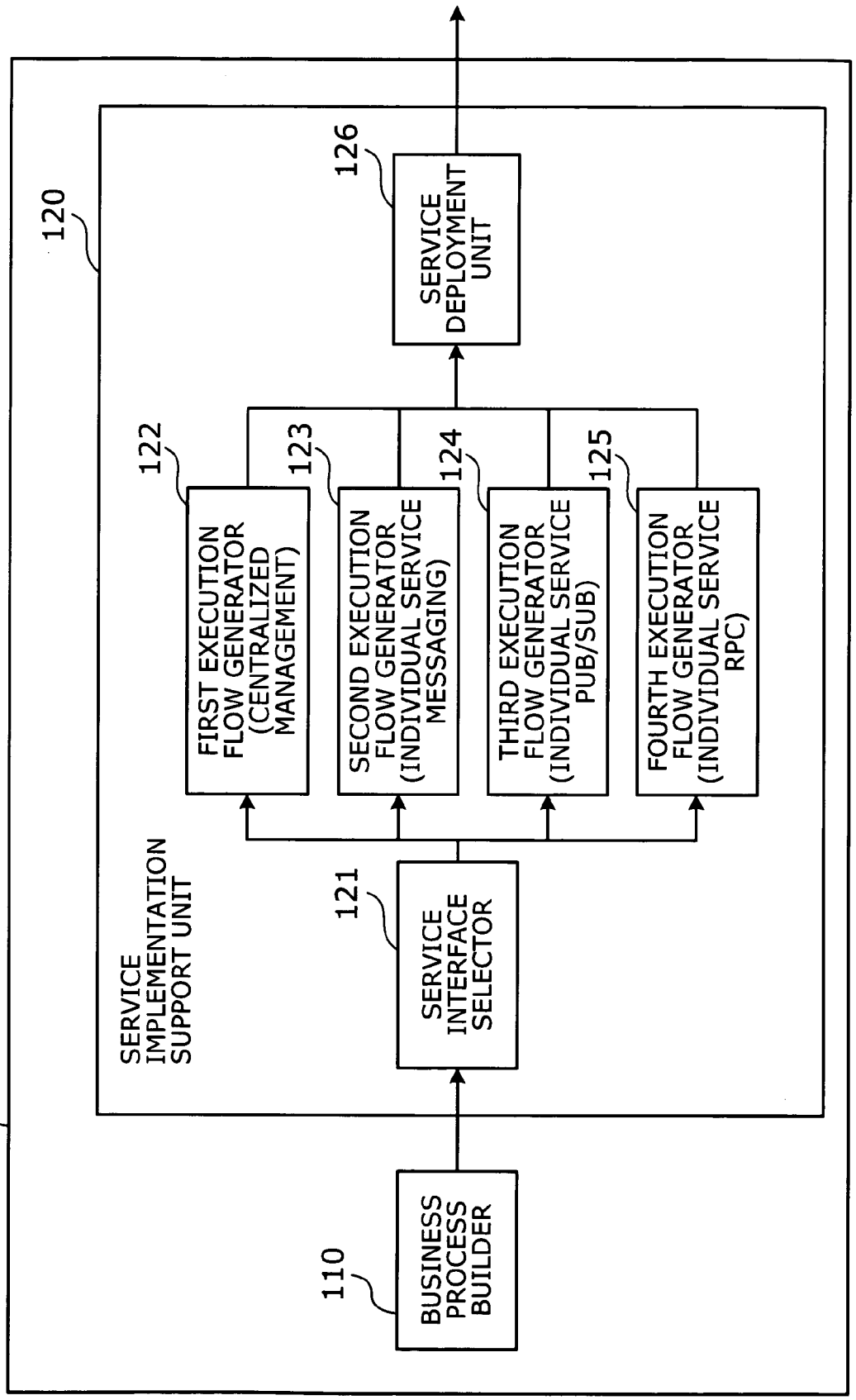
FIG. 4 is a block diagram showing functions of the system administration server.

FIG. 4 is a block diagram showing functions of the system administration server 100. The illustrated system administration server 100 has a business process builder 110 and a service implementation support unit 120. The business process builder 110 creates a business process model according to instructions from a system administrator. This business process model represents a flow of business activities in a graphical way. The created business process model is stored in the RAM 102, which is then passed from the business process builder 110 to the service implementation support unit 120.

The service implementation support unit 120 generates execution flows from a given business process model and supplies them to the servers 31, 32, and 33 via the network 10. To this end, the service implementation support unit 120 has the following elements: a service interface selector 121, a first execution flow generator 122, a second execution flow generator 123, a third execution flow generator 124, a fourth execution flow generator 125, and a service deployment unit 126.

Based on a given business process model, the service interface selector 121 selects a service interface for implementing service-to-service interactions. According to the present embodiment, there are four interface models as options for this selection: "centralized management," "individual service messaging," "individual service pub/sub," and "individual service RPC".

The centralized management model refers to an interface in which a single source service invokes all other necessary services sequentially with RPC. This service interface is suitable for the cases where the overall process flow may be changed often, although it is limited in the reusability of services and reliability of communication between services.

The individual service messaging model refers to an interface which allows a service to invoke another service using an asynchronous messaging mechanism when the invoking service directly depends on the invoked service. This service interface permits business applications to share some of their service components. The present embodiment uses this individual service messaging model as a default option unless an alternative is specified.

The individual service pub/sub model refers to an interface in which a service is allowed to invoke another service using a publish/subscribe (pub/sub) mechanism when the invoking service directly depends on the invoked service. In a pub/sub system, the sending service addresses a message to all services that have previously indicated their intention to subscribe to the sending service. This service interface is suitable for implementing one-to-many relationships between services. It also works well in the case where the recipients may change dynamically. The pub/sub model is, however, inconvenient in some cases where the sending service cannot control recipients.

The individual service RPC model refers to an interface in which a service is allowed to invoke another service using RPC when the invoking service directly depends on the invoked service. This service interface is advantageous when realtime response is required or when asynchronous messaging is not appropriate. One drawback is that the invoking service has to wait until the invoked service finishes its work.

Typically the system administrator specifies appropriate service interfaces, taking their respective advantages and disadvantages into consideration, and the service interface selector 121 accordingly applies them to a given business process model. It is not always necessary to use the same service interface for every service. Rather, different service interfaces may be used to connect different services. Suppose, for example, that a business process model includes three services named "Service_A," "Service_B," and "Service_C." It is allowed, in this case, to use one interface model to connect Service_A with Service_B while another interface model is used for Service_B and Service_C.

The service interface selector 121 may also be designed to analyze a given business process model to determine an optimal service interface automatically. For example, the service interface selector 121 may select an individual service RPC model when an invoking service needs a reply, while otherwise selecting an individual service messaging model.

Depending on the selection of a service interface, one of the four execution flow generators 122 to 125 is activated. Specifically, the first execution flow generator 122 generates an execution flow from a given business process model by linking services according to a centralized management model (referred to also as a first service interface model). The second execution flow generator 123 generates an execution flow from a given business process model by linking services according to an individual service messaging model (referred to also as a second service interface model). The third execution flow generator 124 generates an execution flow from a given business process model by linking services according to an individual service pub/sub model (referred to also as a third service interface model). The fourth execution flow generator 125 generates an execution flow from a given business process model by linking services according to an individual service RPC model (referred to also as a fourth service interface model).

Those four execution flow generators 122, 123, 124, and 125 can also manage execution flows that they created in the past. If an existing service is found reusable in a new execution flow, the first to fourth execution flow generators 122, 123, 124, and 125 are allowed to use that existing service as a lane, instead of recreating an execution flow for that lane. If this is the case, the first to fourth execution flow generators 122, 123, 124, and 125 configure a new execution flow in such a way that it can communicate with the existing execution flow. This feature makes it easy to incorporate existing services.

When producing an execution flow, the first to fourth execution flow generators 122, 123, 124, and 125 specify some properties for each swimlane, including the type, machine name, and Uniform Resource Locator (URL) of a server on which the corresponding service will be deployed. These swimlane properties enable automatic deployment of created execution flows, so that they will be in an executable condition.

The first to fourth execution flow generators 122, 123, 124, and 125 begin their task by building an initial execution flow on the RAM 102. This initial execution flow contains, among others, a required number of swimlanes and start node. The first to fourth execution flow generators 122, 123, 124, and 125 then place additional elements representing processing activities to that initial execution flow until a complete service is defined.

The service deployment unit 126 deploys the created execution flows on their corresponding servers 31, 32, and 33. The deployment of an execution flow means installing service providing functions on a server by using the execution flow. More specifically, the service deployment unit 126 transfers an execution flow to a server and remotely configures some necessary parameters (e.g., addresses of related servers) for execution, so that an intended service will be provided on that server according to the deployed execution flow.

The above system operates as follows. First, the system administrator creates a business process model by interacting with the business process builder 110. The system administrator then instructs the system administration server 100 to implement necessary services to realize the created business process. This instruction causes the business process model of interest to be passed to the subsequent service implementation support unit 120.

Inside the service implementation support unit 120, the given business process model reaches the service interface selector 121, so that an appropriate service interface will be selected. The service interface selector 121 passes the business process model to an execution flow generator corresponding to the selected service interface. Specifically, the first execution flow generator 122 translates the given business process model into execution flows that invoke services in a centralized manner. The second execution flow generator 123 produces execution flows in which the services communicate according to the individual service messaging model. Likewise, the third execution flow generator 124 produces execution flows in which the services communicate according to the individual service pub/sub model, and the fourth execution flow generator 125 produces execution flows in which the services communicate according to the individual service RPC model. The produced execution flow are passed to the service deployment unit 126. Finally the service deployment unit 126 deploys those execution flows on the specified servers. The following sections will provide more details about how execution flows are created with each service interface.

First Service Interface Model

This section explains the first service interface model, or "centralized management model," in which a single source service calls all other services sequentially with RPC.

Figure 5:
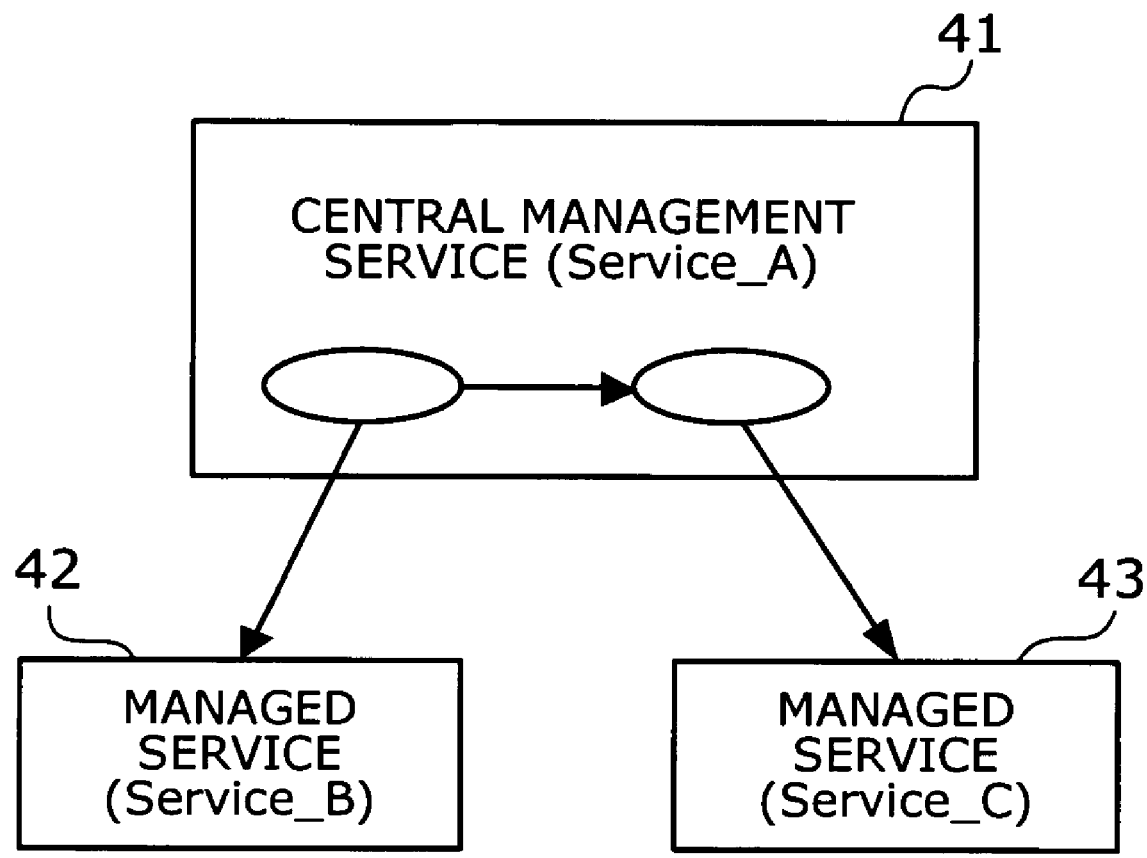
FIG. 5 shows how services are invoked according to a centralized management model.

FIG. 5 shows how services are invoked in the case of centralized management. In the example of FIG. 5, a central management service 41, named "Service_A," manages other services 42 and 43, named "Service_B" and Service_C, in a centralized manner. The managed services 42 and 43 will never be invoked by other than the central management service 41.

Figure 6:
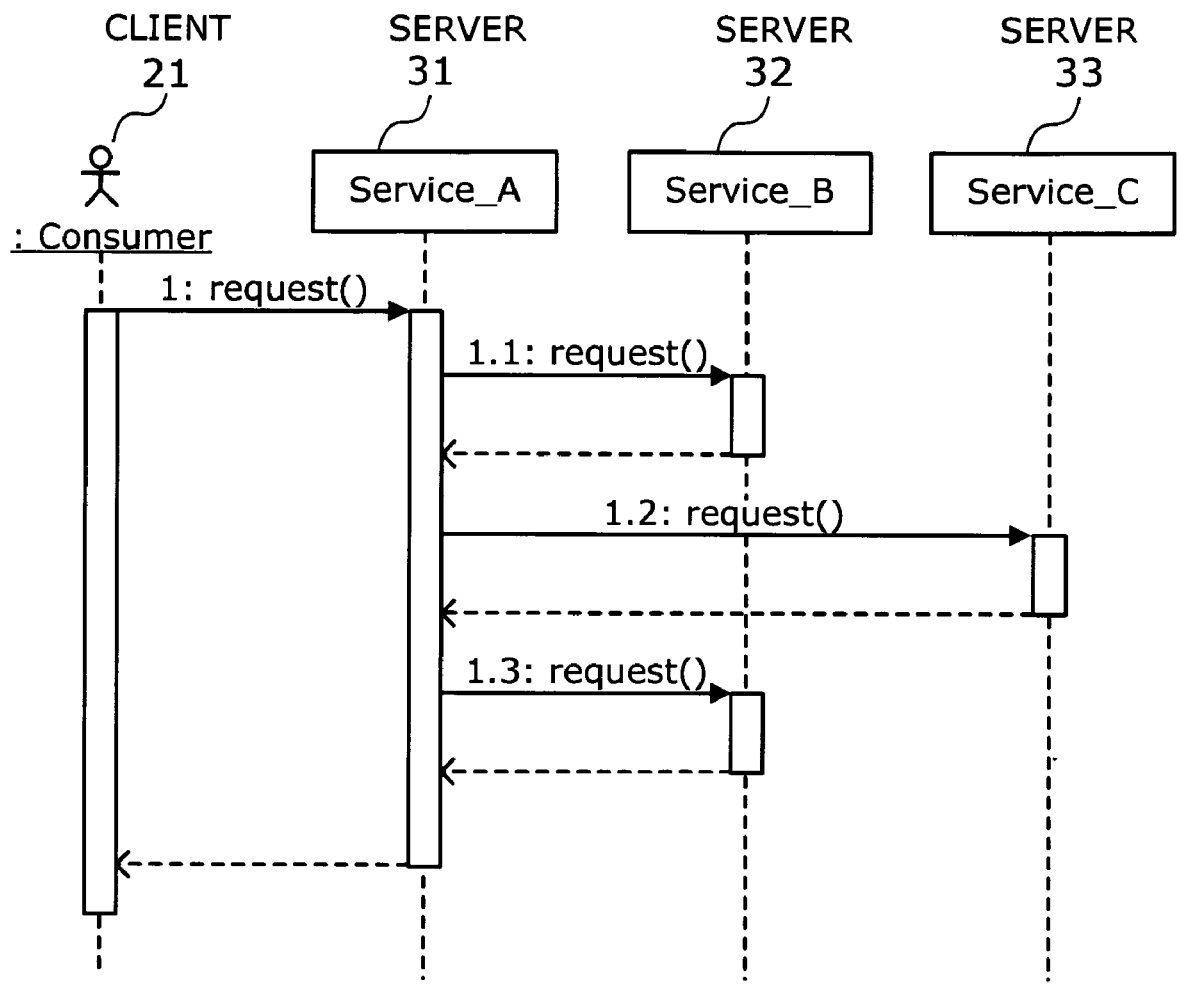
FIG. 6 shows how messages are communicated according to a centralized management model.

FIG. 6 shows how messages are communicated in the case of centralized management. It is assumed here that a user process named "Consumer" is running on a client 21. It is also assumed that Service_A is running on a first server 31, Service_B on a second server 32, and Service_C on a third server 33.

According to the centralized management model, the user process on the client 21 issues a request "1: request( )" addressed to the central management service 41, or Service_A, which causes Service_A to be invoked in the first server 31. When Service_A comes to a point where Service_B is needed, the first server 31 sends a request "1.1: request( )" to the second server 32. The second server 32 performs Service_B and returns a response to Service_A running on the first server 31. The first server 31 resumes its own tasks of Service_A and reaches a point where Service_C is needed. The first server 31 accordingly sends a request "1.2: request( )" to the third server 33. The third server 33 executes Service_C and returns a response to Service_A on the first server 31. After that, a need for Service_B arises again in Service_A, causing a request "1.3: request( )" to be sent from the first server 31 to the second server 32. The second server 32 performs Service_B again and returns a response to Service_A on the first server 31.

The specified business process is executed in this way, by coordinating distributed services in a centralized manner. This service interface is suitable for the cases where the process flow may be changed often. Since every service invocation is based on a request from the central management service 41, the sequence of other services 42 and 43 can be changed easily by modifying the order of requests to be issued from the central management service 41, which is described in the execution flow of the central management service 41.

Figure 7:
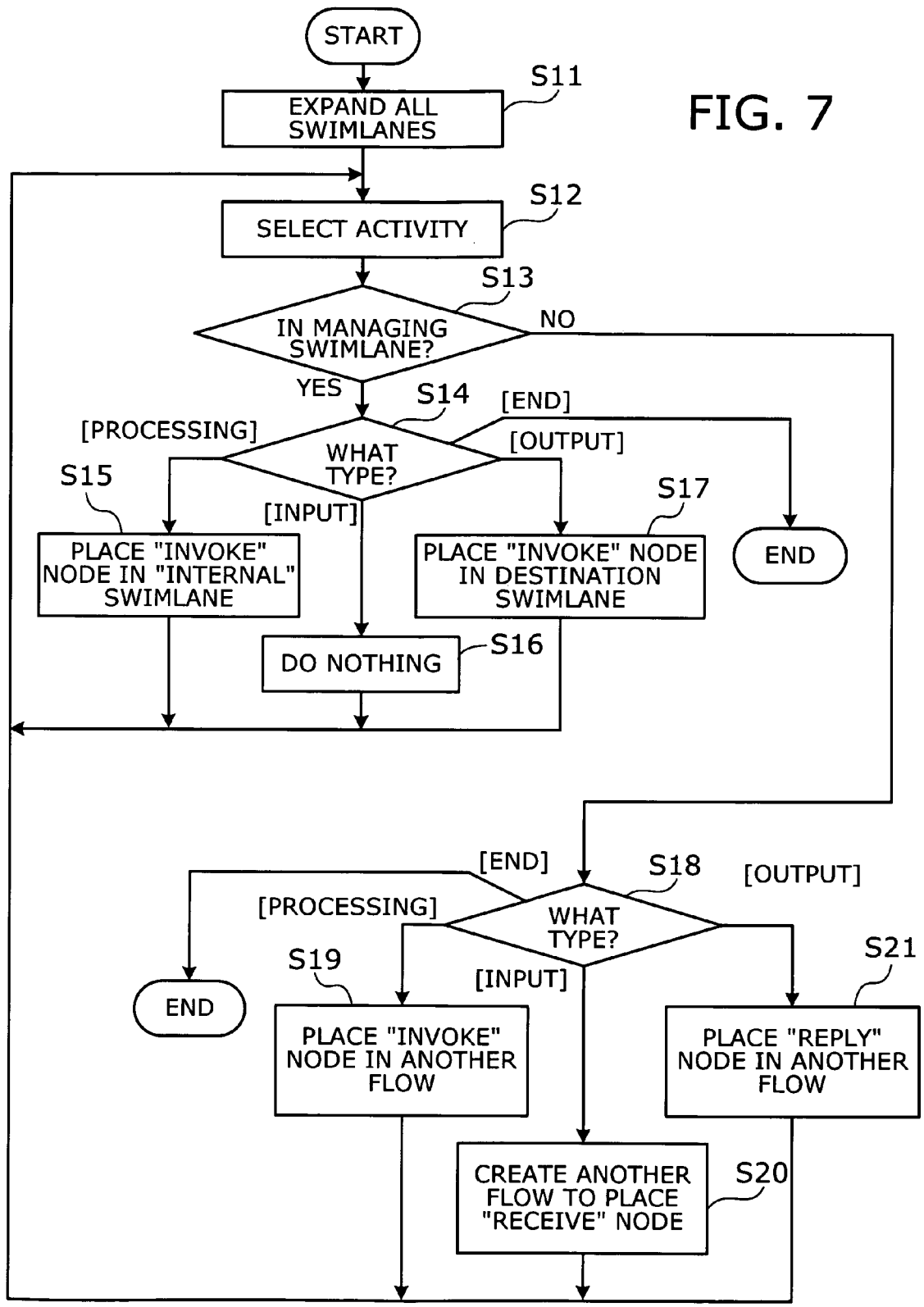
FIG. 7 is a flowchart of a process of generating an execution flow according to a centralized management model.

Referring now to a flowchart of FIG. 7, a process of generating an execution flow in the case of centralized management will be described below. As FIG. 7 shows, this process proceeds in the following steps:

(Step S11) The first execution flow generator .122 expands all swimlanes. This means that an input interface and an output interface are added to every processing block (or action) in each swimlane of the given business process model.

Specifically, the business process model has a start node from which the process begins. The first execution flow generator 122 regards the swimlane containing a start node as a managing swimlane. The first execution flow generator 122 produces an execution flow for the central management service, which includes swimlanes corresponding to those in the source business process model. Of all swimlanes in this execution flow, the one containing a start node is named "internal" to indicate that the swimlane represents an internal service of the managing server.

(Step S12) The first execution flow generator 122 traces activities (i.e., nodes in the business process model) from the beginning of the process. More specifically, the first execution flow generator 122 first selects an activity that follows the start node. Each time it returns to step S12, the first execution flow generator 122 selects a new activity that is connected the current activity.

(Step S13) The first execution flow generator 122 determines whether the selected activity is in the managing swimlane. More specifically, the newly selected node may still remain in the managing swimlane or may have moved to another swimlane. If the former is the case, the process advances to step S14. If the latter is the case, the process proceeds to step S18.

(Step S14) The first execution flow generator 122 identifies the type of the selected activity. If the activity type is "processing," the process advances to step S15. If it is "input," the process advances to step S16. If it is "output," the process advances to step S17. If it is "end," then process terminates itself.

(Step S15) For the "processing" activity, the first execution flow generator 122 places an "invoke" node in the "internal" swimlane of the execution flow corresponding to the managing swimlane. If, at this time, the preceding node is found to be an "input" activity immediately following the start node, the first execution flow generator 122 places a corresponding "receive" node before the invoke node. The process then goes back to step S12.

(Step S16) For the "input" activity, the first execution flow generator 122 advances the process to step S12 without doing anything about the execution flow at hand.

(Step S17) For the "output" activity, the first execution flow generator 122 places an "invoke" node on a destination swimlane of output data in an execution flow corresponding to the managing swimlane. The process then goes back to step S12. Note that the above-described placement of a new node does not take place in the case where the node subsequent to the currently selected activity is an end node.

(Step S18) Now that the selection has moved to a different swimlane, the first execution flow generator 122 identifies the type of the selected activity. If the activity type is "processing," the process advances to step S19. If it is "input," the process advances to step S20. If it is "output," the process advances to step S21. If it is "end," then process is terminated.

(Step S19) The first execution flow generator 122 places an "invoke" node in the "internal" swimlane of the execution flow corresponding to the destination swimlane. If the preceding node is found to be an "input" activity, the first execution flow generator 122 places a "receive" node corresponding to that activity before the invoke node. The process then goes back to step S12.

(Step S20) The first execution flow generator 122 creates an execution flow corresponding to the destination swimlane and places a "receive" node in that execution flow. The process then goes back to step S12.

(Step S21) The first execution flow generator 122 places a "reply" node in the execution flow corresponding to the destination swimlane. The first execution flow generator 122 further places an "invoke" node in the destination swimlane of the execution flow corresponding to the central management service. The process then goes back to step S12.

Figure 8:
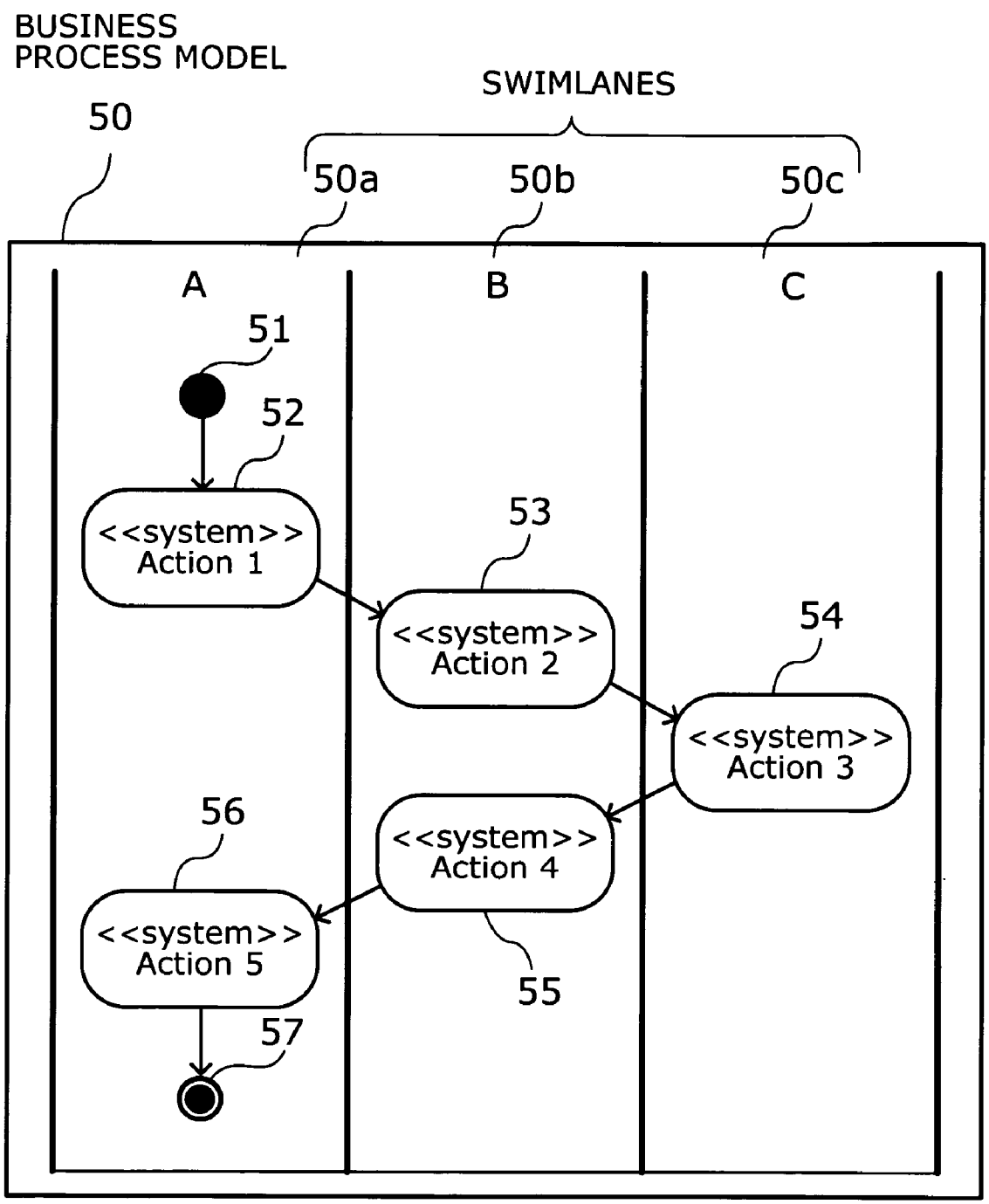
FIG. 8 shows an example of a business process model.

The following subsection will describe a specific example of how to create an execution flow according to a centralized management model. In FIG. 8 and subsequent diagrams, a solid line with an open arrow head indicates a transition across activities in a business process model or execution flow, and a broken line with an open arrow head represents a flow of a data element.

FIG. 8 shows an example of a business process. The illustrated business process model 50 has a plurality of swimlanes 50a, 50b, and 50c. Each swimlane represents a particular function that is required to implement a given business process. In the case of a web-based business process, for example, the first swimlane 50a typically represents a web server function, the second swimlane 50b an application server function, and the third swimlane 50c a database server function.

Suppose here that the first swimlane 50a corresponds to a service named "Service_A," the second swimlane 50b corresponds to a service named "Service_B," and the third swimlane 50c corresponds to a service named "Service_C." The business process model 50 of FIG. 8 shows transitions across activities, or nodes 52 to 56, beginning at a start node 51 and terminating at an end node 57. The nodes 52 and 56 represent specific activities performed by a function of the first swimlane 50a. The nodes 53 and 55 represent other specific activities performed by a function of the second swimlane 50b, and the node 54 represents yet another activity performed by a function of the third swimlane 50c.

The given business process model 50 of FIG. 8 is first subjected to an expansion process to add some data elements describing interface between activities. More specifically, the expansion process places an input interface and an output interface to each transition between swimlanes.

Figure 9:
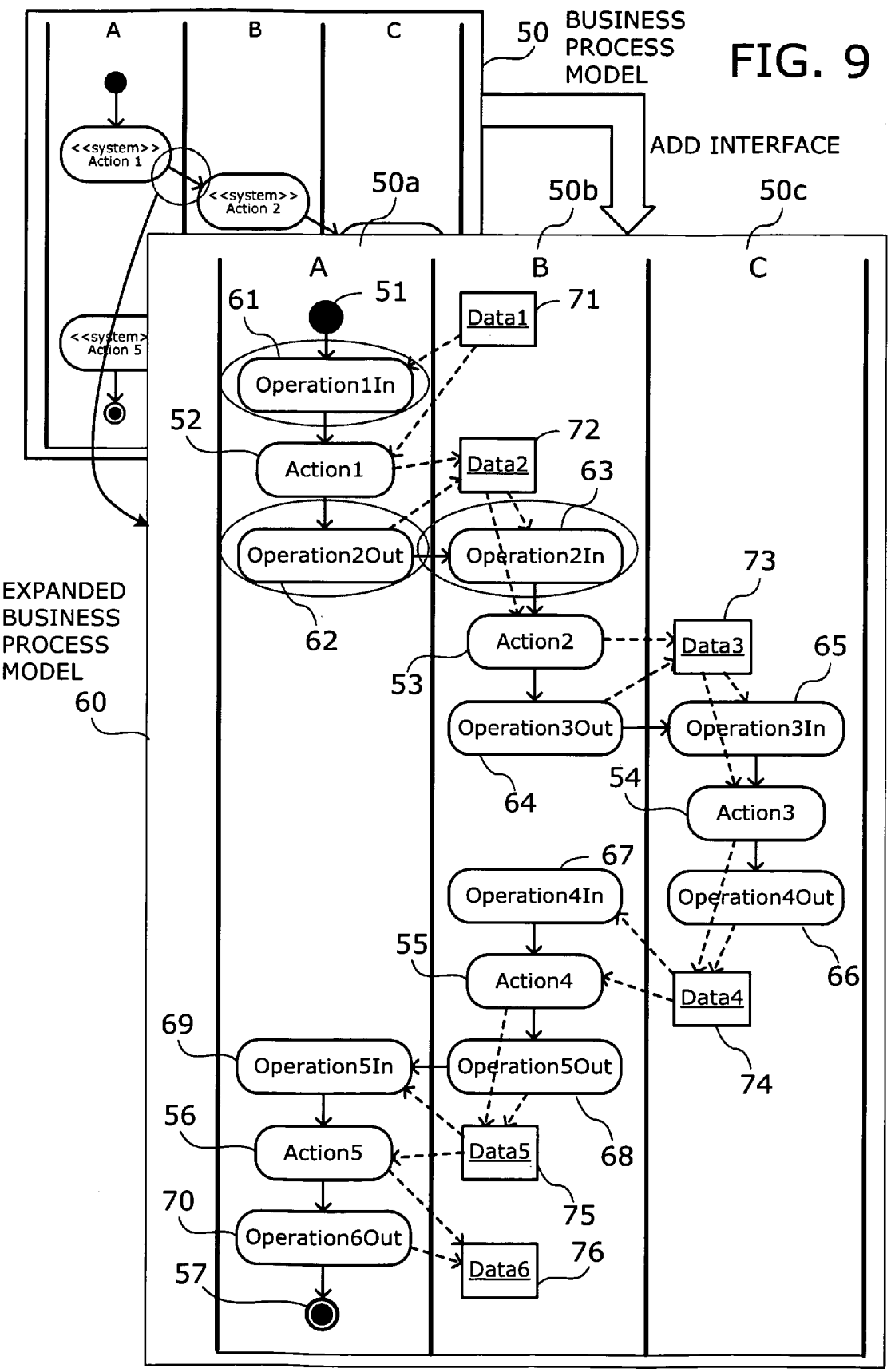
FIG. 9 shows an expanded business process model.

FIG. 9 shows an expanded business process model 60 derived from the source business process model 50. As noted before, swimlanes represent different services. The first execution flow generator 122 finds a start node 51 and its subsequent node 52 in the source business process model 50 and thus inserts a new node 61 representing an input handling activity (input interface) between the two nodes 51 and 52. Likewise, the first execution flow generator 122 inserts a new node 70 representing an output handling activity (output interface) to a point before the end node 57.

The first execution flow generator 122 adds more new nodes 62 to 69 to send and receive messages to/from another service. Those communication interface nodes for output and input of messages are placed at each transition between swimlanes. This stage may involve some intervention of a system administrator, allowing him/her to modify a communication interface and message format. Also added by the first execution flow generator 122 are data elements 71 to 76 to be exchanged between the activities.

An expanded business process model 60 is produced by expanding the given source business process model 50 in the above-described way. The expansion processing is followed by a task of creating an execution flow of Service_A, the central management service.

Figure 10:
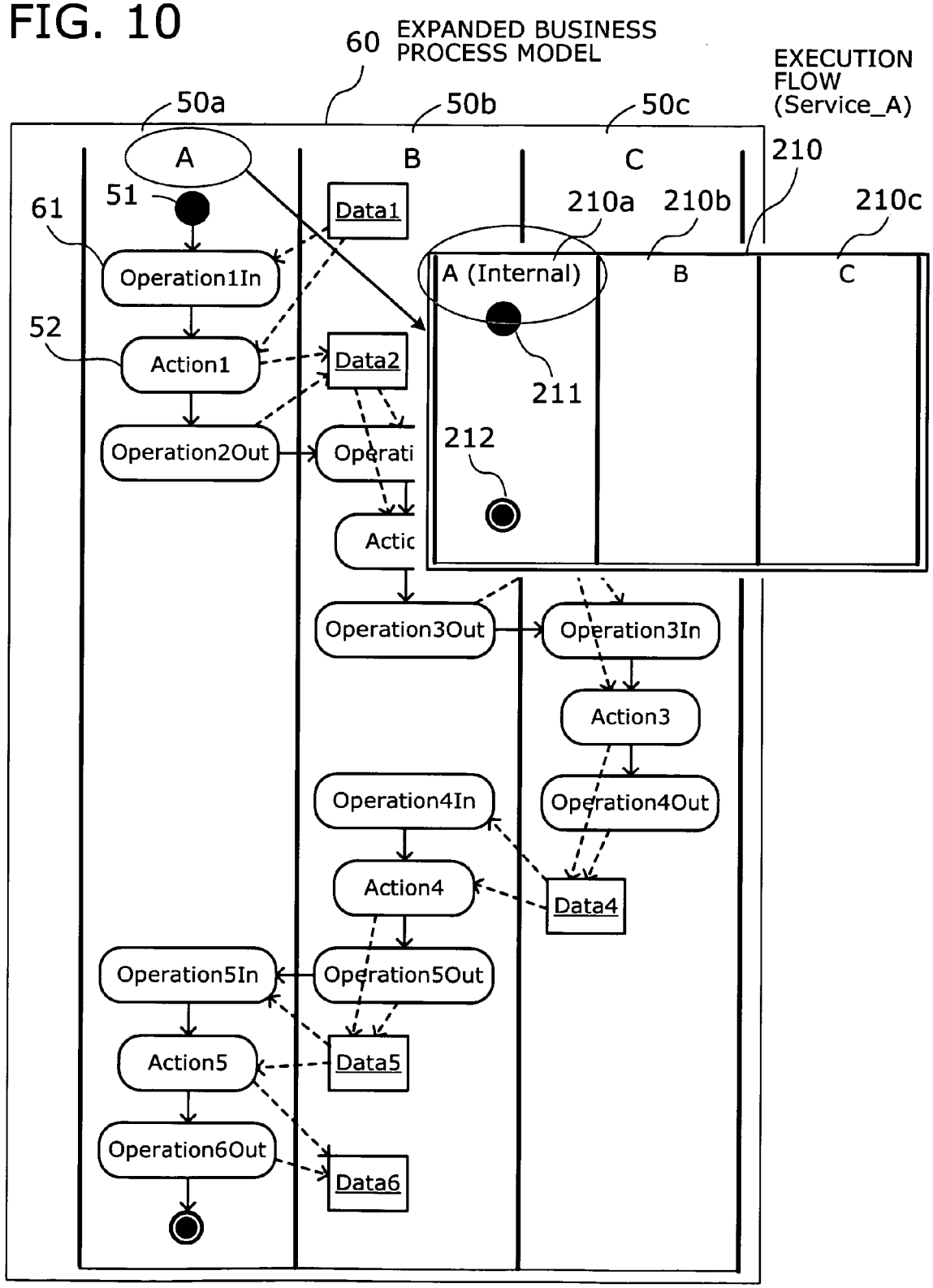
FIG. 10 shows an initial state of an execution flow of Service_A.

FIG. 10 shows an initial state of this Service_A execution flow. The created execution flow 210 has three swimlanes 210a, 210b, and 210c corresponding to the swimlanes 50a, 50b, and 50c of the expanded business process model 60. The start node 51 of the expanded business process model 60 lies in a swimlane 50a, and its corresponding swimlane 210a in the execution flow 210 is thus labeled "internal." This "internal" swimlane 210a represents what will be performed by a server in which the present execution flow 210 is to be deployed.

The "internal" swimlane 210a is located at the leftmost of the execution flow 210, which is followed by other swimlanes 210b and 210c for other services invoked from the managing service. Placed in the managing swimlane 210a are a start node 211 and an end node 212.

Leaving the start node 51, the first execution flow generator 122 selects activity nodes one by one, while adding new elements to the execution flow 210 in process each time a newly selected node is processed. The execution flow 210 is, however, not affected by the first selected node 61 since it is an "input" activity. The first execution flow generator 122 then selects the next node 52, which is a "processing" activity belonging to the managing swimlane 50a (Service_A). Accordingly the first execution flow generator 122 adds a corresponding new node to the "internal" swimlane 210a of the execution flow 210.

Figure 11:
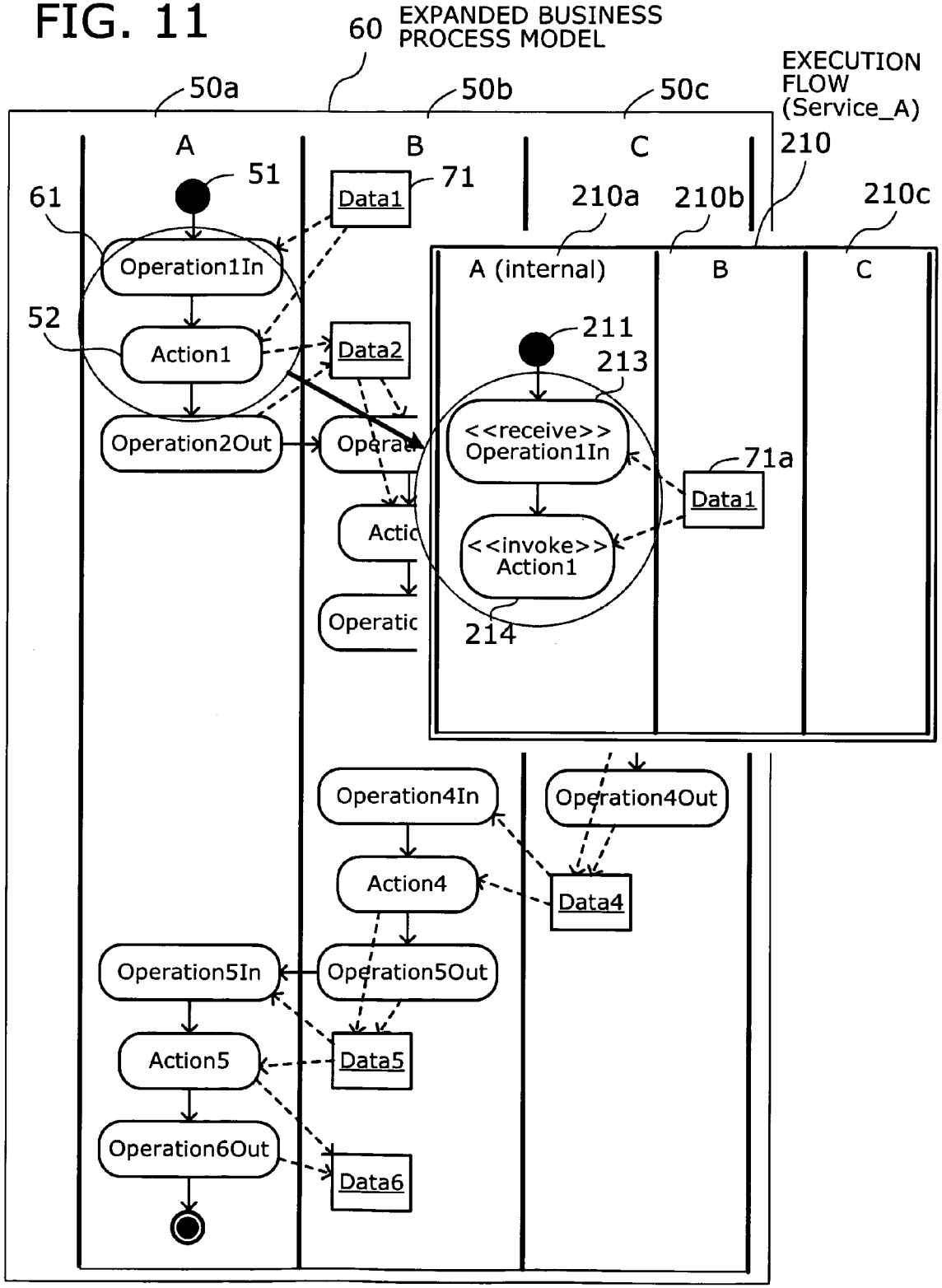
FIG. 11 shows a new state of the execution flow including elements for a "processing" activity.

FIG. 11 shows a new state of the execution flow 210 which includes elements corresponding to the "processing" activity described above. Specifically, an "invoke" node 214 corresponding to the activity node 52 has been added to the "internal" swimlane 210a of the execution flow 210. Another new element of the swimlane 210a is a "receive" node 213 corresponding to the receive interface node 61 of Service_A. Also added is a data element 71a corresponding to input data 71 in the expanded business process model 60. This data element 71a is passed from the "receive" node 312 to the "invoke" node 214.

The first execution flow generator 122 then selects a node 62 representing an "output" activity in the managing swimlane 50a (Service_A). Accordingly the first execution flow generator 122 adds a corresponding new node to the destination swimlane 210b of the execution flow 210.

Figure 12:
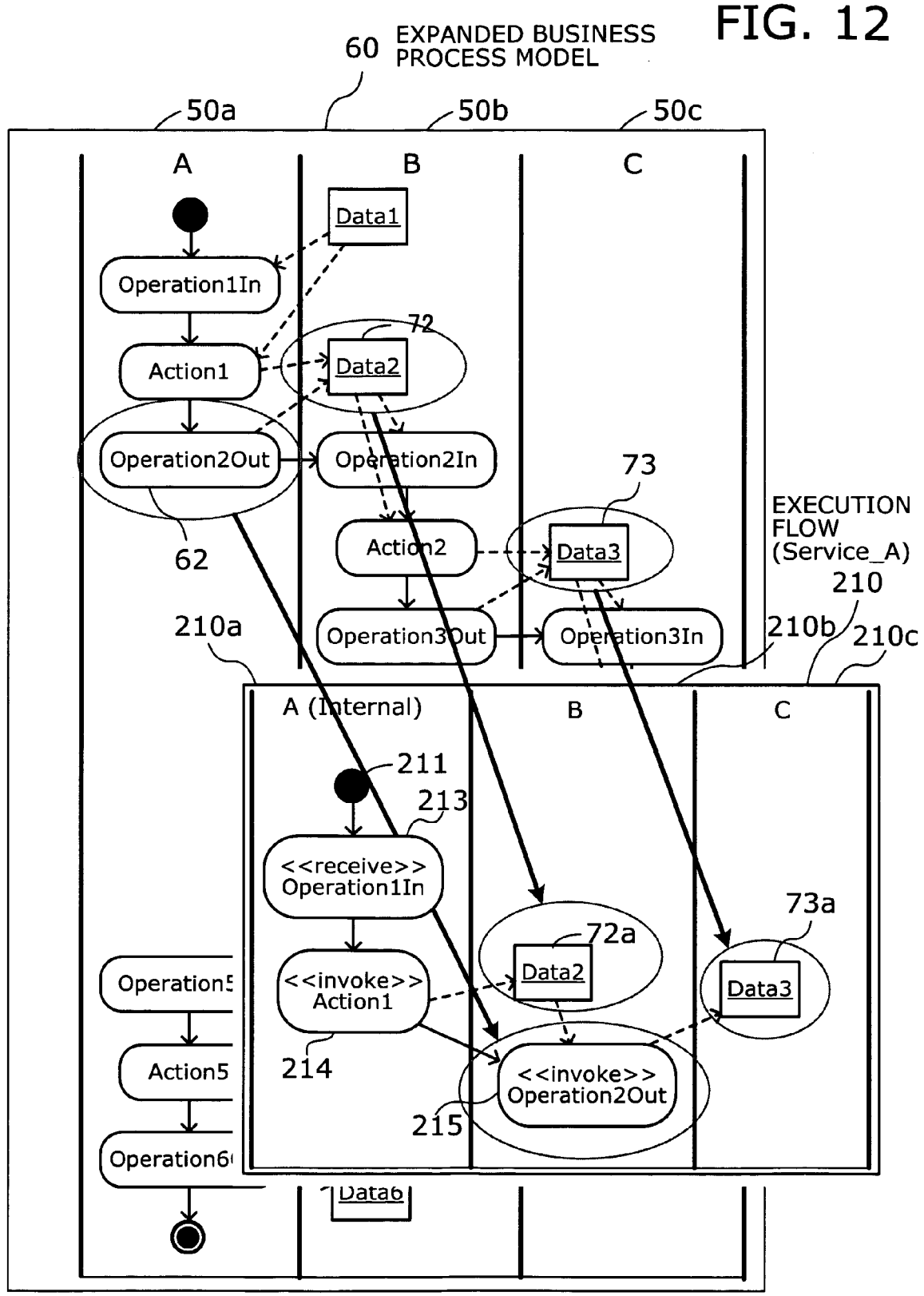
FIG. 12 shows a new state of the execution flow including elements for an "output" activity.

FIG. 12 shows a new state of the execution flow 210 which includes elements derived from the "output" activity node 62 described above. Specifically, an "invoke" node 215 corresponding to the "output" activity node 62 has been added to the Service_B swimlane 210b of the execution flow 210. Also added to the execution flow 210 is a data element 72a corresponding to data 72 that is passed from the node 62 to the node 63 in the expanded business process model 60. Another new element added to the execution flow 210 is a data element 73a produced by the "invoke" node 215. This data element 73a corresponds to output data 73 of the node 64.

The next selected node 63, representing an "input" activity, lies not in the managing swimlane 50a, but in the Service_B swimlane 50b next to it. To execute this Service_B, a new execution flow should be produced. In the expanded business process model 60, the "input" node 63 is followed by an activity node 53 and then by an output interface node 64. Accordingly, the first execution flow generator 122 places new nodes corresponding to those nodes 53 and 64 in the newly produced execution flow of Service_B.

Figure 13:
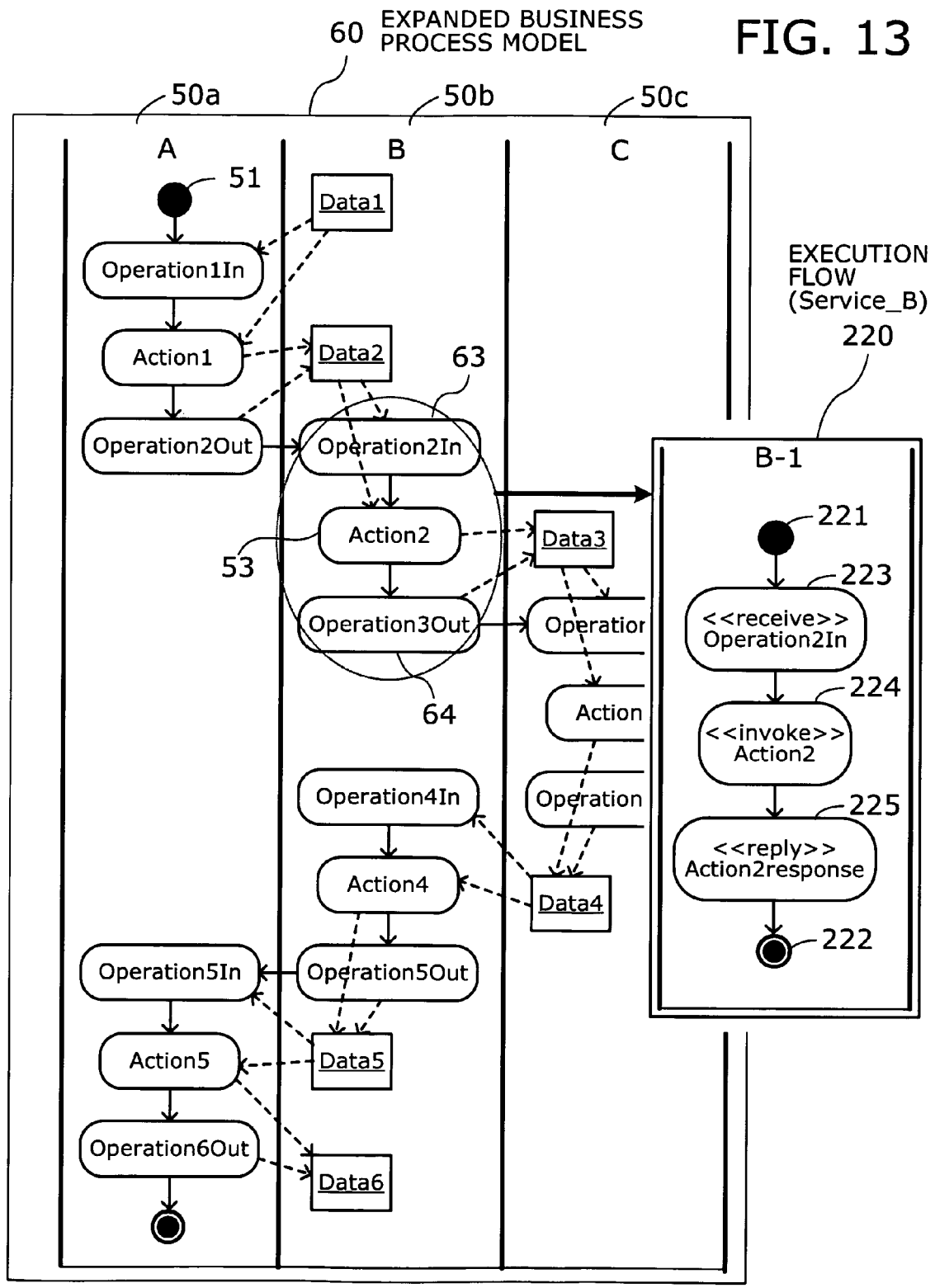
FIG. 13 shows an execution flow created for Service_B.

FIG. 13 shows an execution flow 220 of Service_B created on the basis of the "input" activity node 63. This execution flow 220 has a single swimlane beginning at a start node 221 and closing at an end node 222. Placed next to the start node 221 is a "receive" node 223, which corresponds to the "input" activity node 63 of the expanded business process model 60. The node 223 in the execution flow 220 is then followed by an "invoke" node 224. This node 224 corresponds to the "processing" activity node 53 in the expanded business process model 60. Also added to the execution flow 220 is a "reply" node 225 corresponding to the "output" activity node 64 in the expanded business process model 60. This "reply" node 225 is linked to the end node 222.

The service defined in the execution flow 220 of FIG. 13 is named "Service_B-1." This execution flow 220 defines a part of the expanded business process model 60 before Service_C is invoked indirectly. Specifically, Service_B-1 is a synchronous service that replies to an invocation from Service_A. The return value of this service is an invocation message for Service_C.

Figure 14:
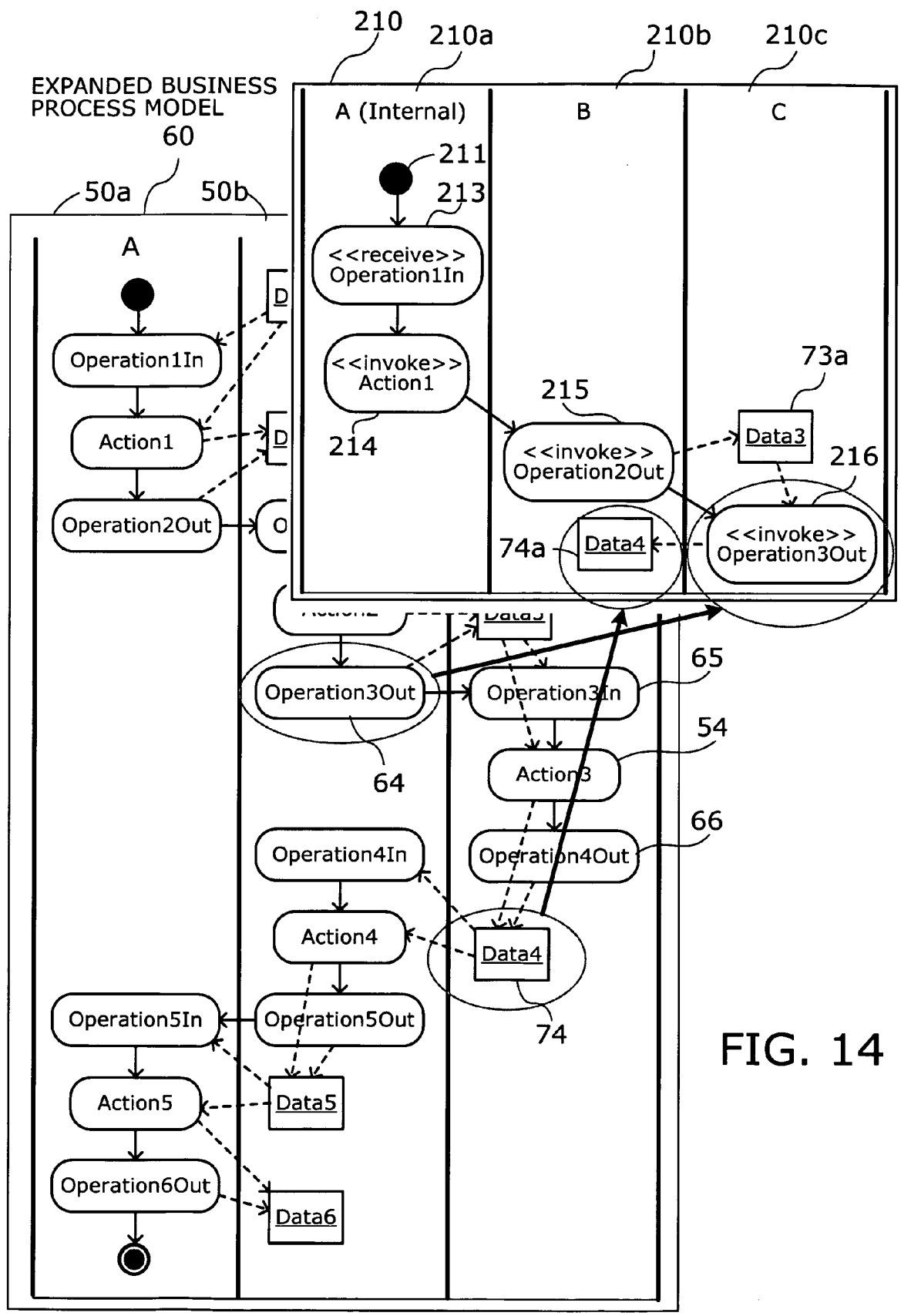
FIG. 14 shows a new state of the execution flow under construction with a centralized management model, now including some elements for an "output" activity in a non-managing swimlane.

Now that the Service_B-1 execution flow 220 is created in the above-described way, the first execution flow generator 122 then turns again to the Service_A execution flow 210 to include an "output" activity node 64 of the expanded business process model 60. FIG. 14 shows a new state of the execution flow 210 under construction with a centralized management model, now including some elements for an "output" activity node 64 in a non-managing swimlane 50b of the expanded business process model 60. Specifically, an "invoke" node 216 corresponding to the "output" activity node 64 has been added to the third swimlane 210c of the Service_A execution flow 210. This node 216 is linked from the preceding "invoke" node 215 in the second swimlane 210b. Another new element of the execution flow 210 is an input data element 73a directed to the "invoke" node 216. Also added is an output data element 74a of the same node 216, which corresponds to result data 74 obtained at the end of the third swimlane 50c of the expanded business process model 60.

The next node 65 representing an "input" activity in the expanded business process model 60 lies, not in the managing swimlane 50a, but in the third swimlane 50c for Service_C. The first execution flow generator 122 thus creates a new execution flow for that Service_C accordingly. The node 65 in the expanded business process model 60 is followed by subsequent nodes 54 and 66 in the third swimlane 50c in that order, and their corresponding nodes will be added to the Service_C execution flow.

Figure 15:
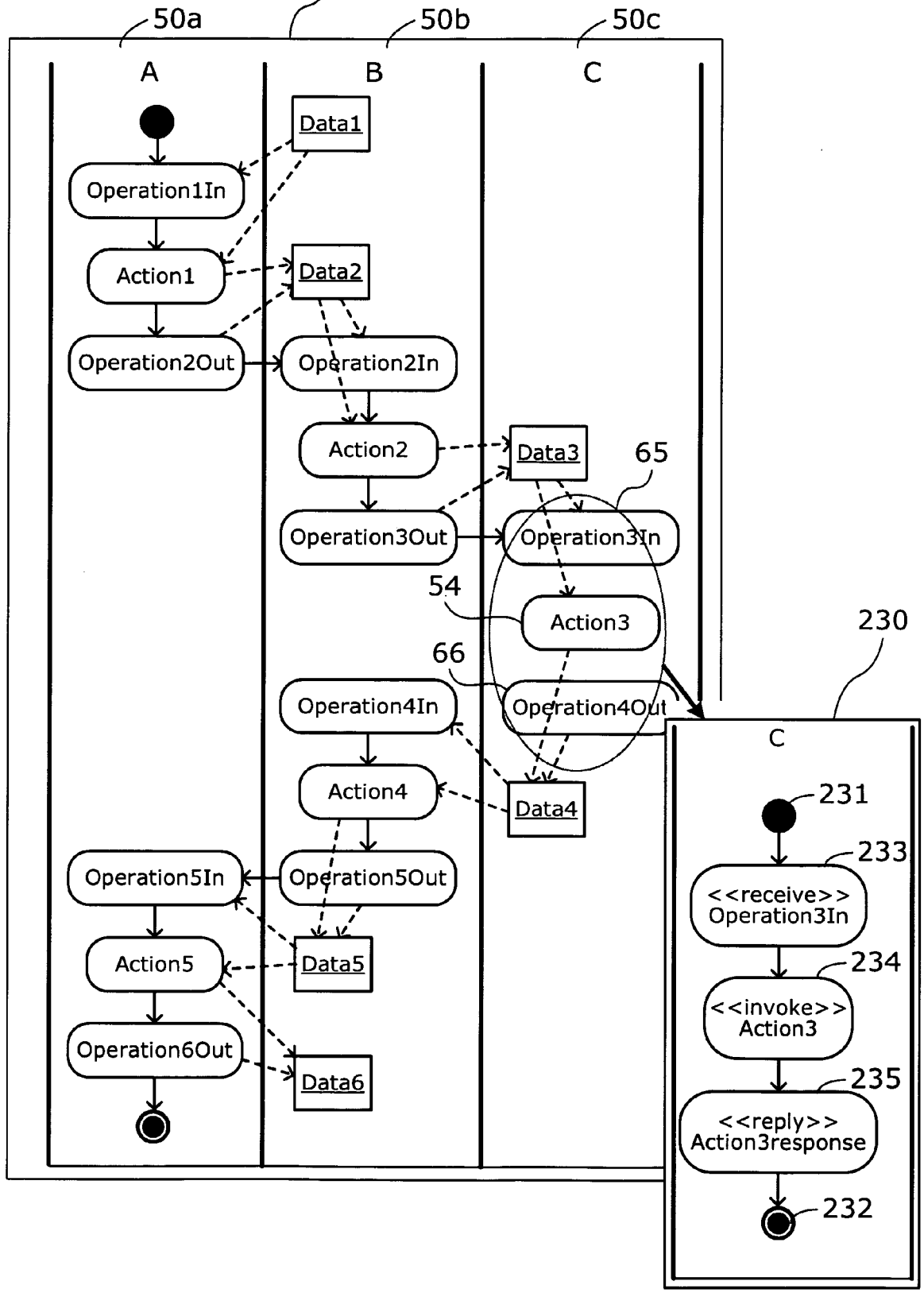
FIG. 15 shows an execution flow created for Service_C.

FIG. 15 shows an execution flow 230 of Service_C that is created on the basis of the "input" activity node 65. This execution flow 230 has a single swimlane beginning at a start node 231 and closing at an end node 232. Placed next to the start node 231 is a "receive" node 233, which corresponds to the "input" activity node 65 of the expanded business process model 60. The node 233 in the execution flow 230 then leads to an "invoke" node 234. This node 234 corresponds to the "processing" activity node 54 in the expanded business process model 60. Also added to the execution flow 230 is a "reply" node 235 corresponding to the "output" activity node 66 in the expanded business process model 60. This "reply" node 235 is linked to the end node 232.

The execution flow 230 defines a part of the expanded business process model 60 before Service_B is invoked indirectly. Specifically, Service_C is a synchronous service that replies to an invocation from Service_A. The return value of this service is an invocation message for Service_B.

Now that the Service_C execution flow 230 is created in the above-described way, the first execution flow generator 122 then turns again to the Service_A execution flow 210 to include an "output" activity node 66 of the expanded business process model 60.

Figure 16:
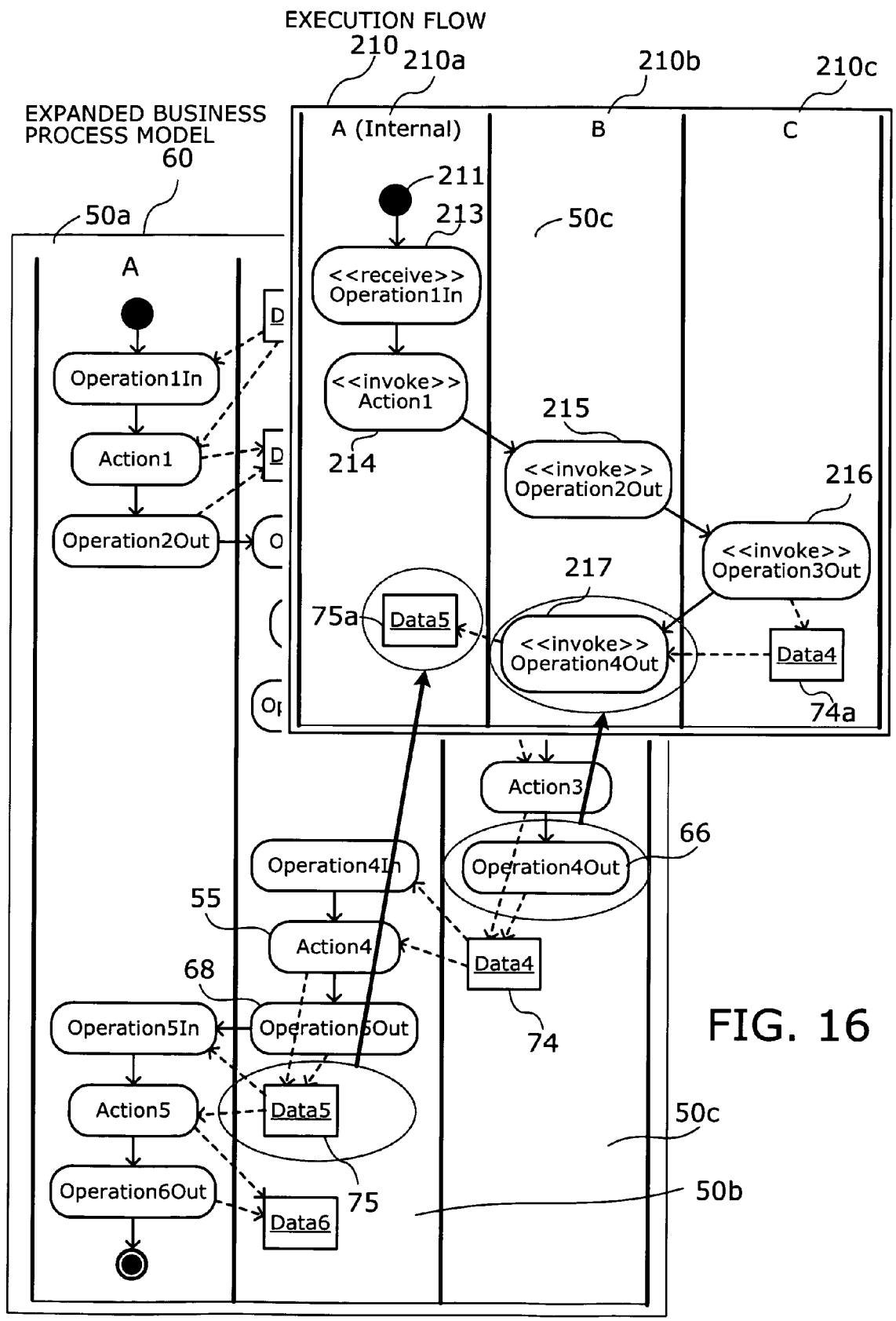
FIG. 16 shows a new state of the execution flow under construction with a centralized management model, now including some elements for an "output" activity in a non-managing swimlane.

FIG. 16 shows a new state of the execution flow 210 under construction with a centralized management model, now including some elements for an "output" activity in a non-managing swimlane. Specifically, an "invoke" node 217 corresponding to the "output" activity node 66 has been added to the second swimlane 210b of the Service_A execution flow 210. This node 217 is linked from the preceding "invoke" node 216 in the third swimlane 210c. Another new element of the execution flow 210 is an input data element 74a directed to the "invoke" node 217. Also added is an output data element 75a of the same node 217, which corresponds to result data 75 obtained at the end of the second swimlane 50b of the expanded business process model 60.

The next selected node 67, representing an "input" activity, lies not in the managing swimlane 50a, but in the Service_B swimlane 50b next to it. To execute this Service_B, a new execution flow should be produced. In the expanded business process model 60, the "input" node 67 is followed by an activity node 55 and then by an output interface node 68. Accordingly, the first execution flow generator 122 places new nodes corresponding to those nodes 55 and 68 in the newly produced execution flow of Service_B.

Figure 17:
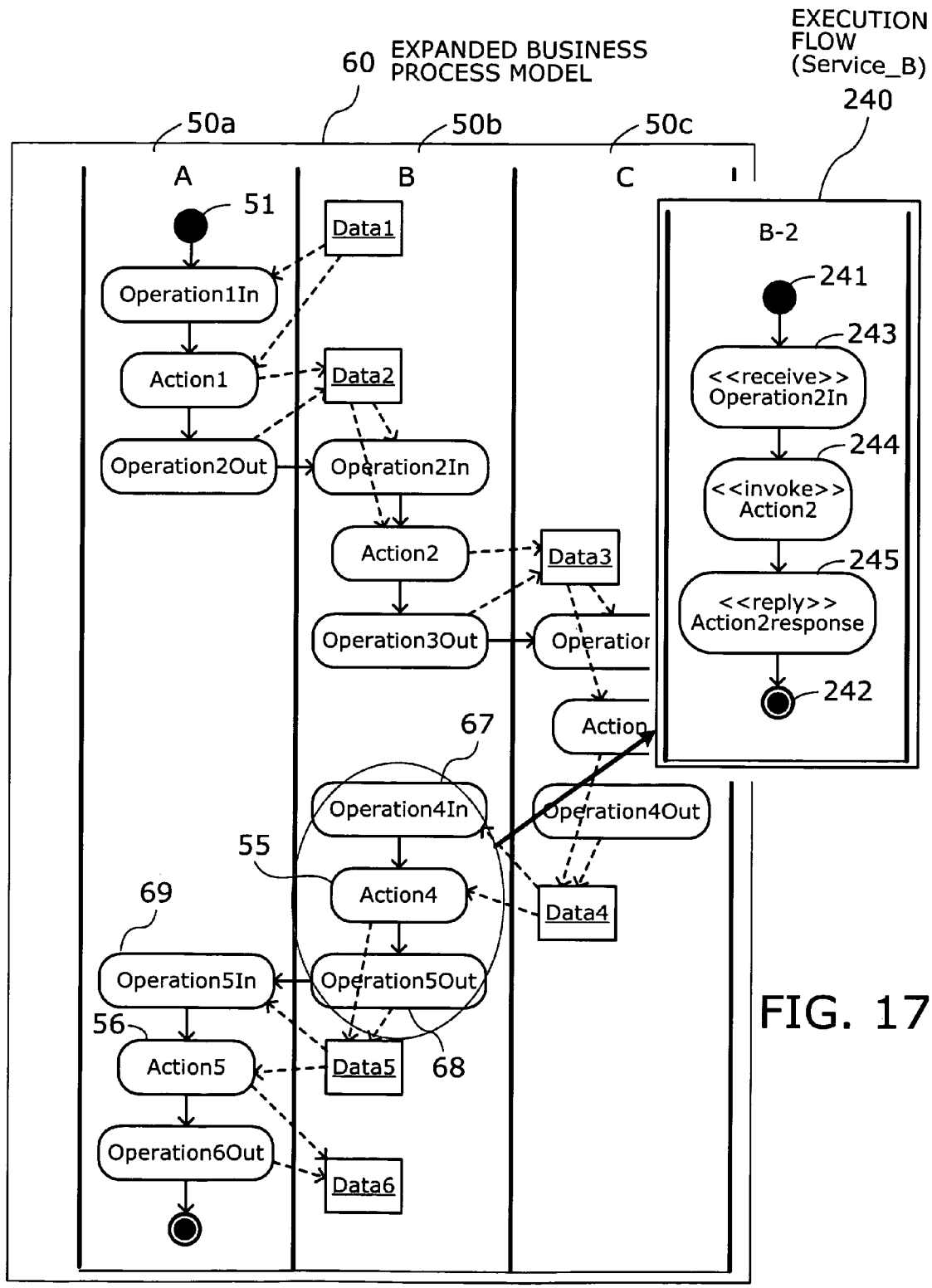
FIG. 17 shows an execution flow created for Service_B.

FIG. 17 shows an execution flow 240 of Service_B created on the basis of the "input" activity node 67. This execution flow 240 has a single swimlane beginning at a start node 241 and closing at an end node 242. Placed next to the start node 241 is a "receive" node 243, which corresponds to the "input" activity node 67 of the expanded business process model 60. The node 243 in the execution flow 240 then leads to an "invoke" node 244. This node 244 corresponds to the "processing" activity node 55 in the expanded business process model 60. Also added to the execution flow 240 is a "reply" node 245 corresponding to the "output" activity node 68 in the expanded business process model 60. This "reply" node 245 is linked to the end node 242.

The execution flow 240 defines a part of the expanded business process model 60 before Service A is invoked. Specifically, Service_B is a synchronous service that replies to an invocation from Service_A. The return value of this service is an invocation message for Service_A.

The service defined in the execution flow 240 of FIG. 17 is named "Service_B-2." While the node 68 in the expanded business process model 60 invokes Service_A, the first execution flow generator 122 does not expand it as an execution flow since it is an invocation of a managing service from a non-managing service.

The next selected node 69 in the managing swimlane 50a represents an "input" activity, and for this reason, no addition or modification is made to the execution flow. The node 69 is then followed by a "processing" activity node 56 in the same managing swimlane 50a. The first execution flow generator 122 thus adds a corresponding new node to the "internal" swimlane 210a of the execution flow 210.

Figure 18:
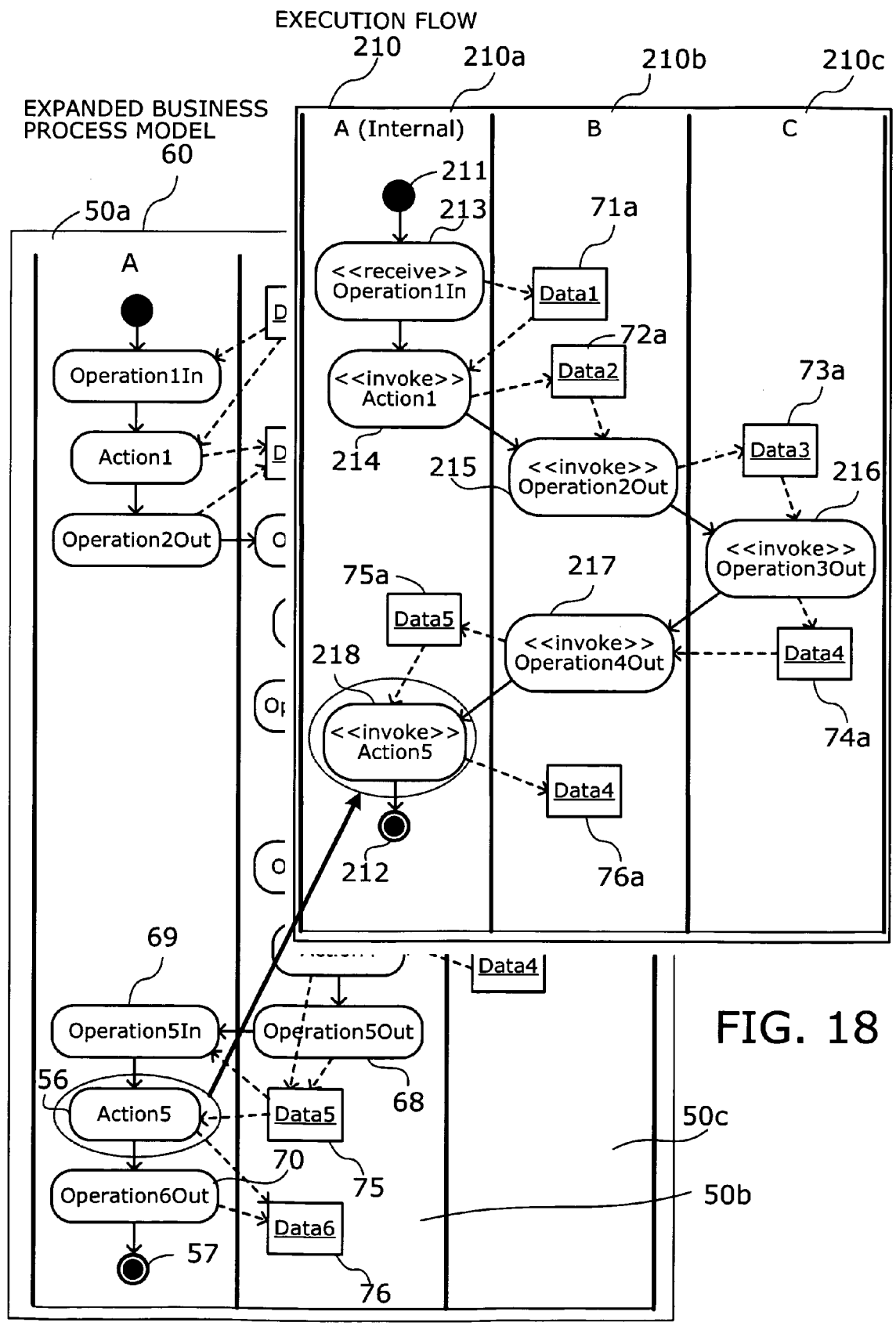
FIG. 18 shows a new state of the execution flow including elements for a "processing" activity.

FIG. 18 shows a new state of the execution flow including elements for a "processing" activity. Specifically, an "invoke" node 218 corresponding to the activity node 56 has been added to the "internal" swimlane 210a of the execution flow 210. Also added is a data element 75a corresponding to input data 75 in the expanded business process model 60. This data element 75a is passed from the preceding node 217 to the new node 218. Another new element added to the execution flow 210 is an output data element 76a produced by the node 218. This data element 76a corresponds to output data 76 of the node 56.

The last "output" activity node 70 in the expanded business process model 60 is linked to the end node 57. This means that the output data 76 is a response to the requesting client. Accordingly the first execution flow generator 122 places a link from the node 218 to the end node 212 in the execution flow 210.

The above-described process creates multiple execution flows 210, 220, 230, and 240 to define each of the services organized in a centrally managed way. The execution flow 210 for Service_A is deployed on a server 31 to provide a central management service 41 (see FIG. 5). The execution flows 220 and 240 are deployed on another server 32 to provide a service 42, or Service_B. The execution flow 230 is deployed on yet another server 33 to provide a service 43, or Service_C.

Second Service Interface Model

Figure 19:
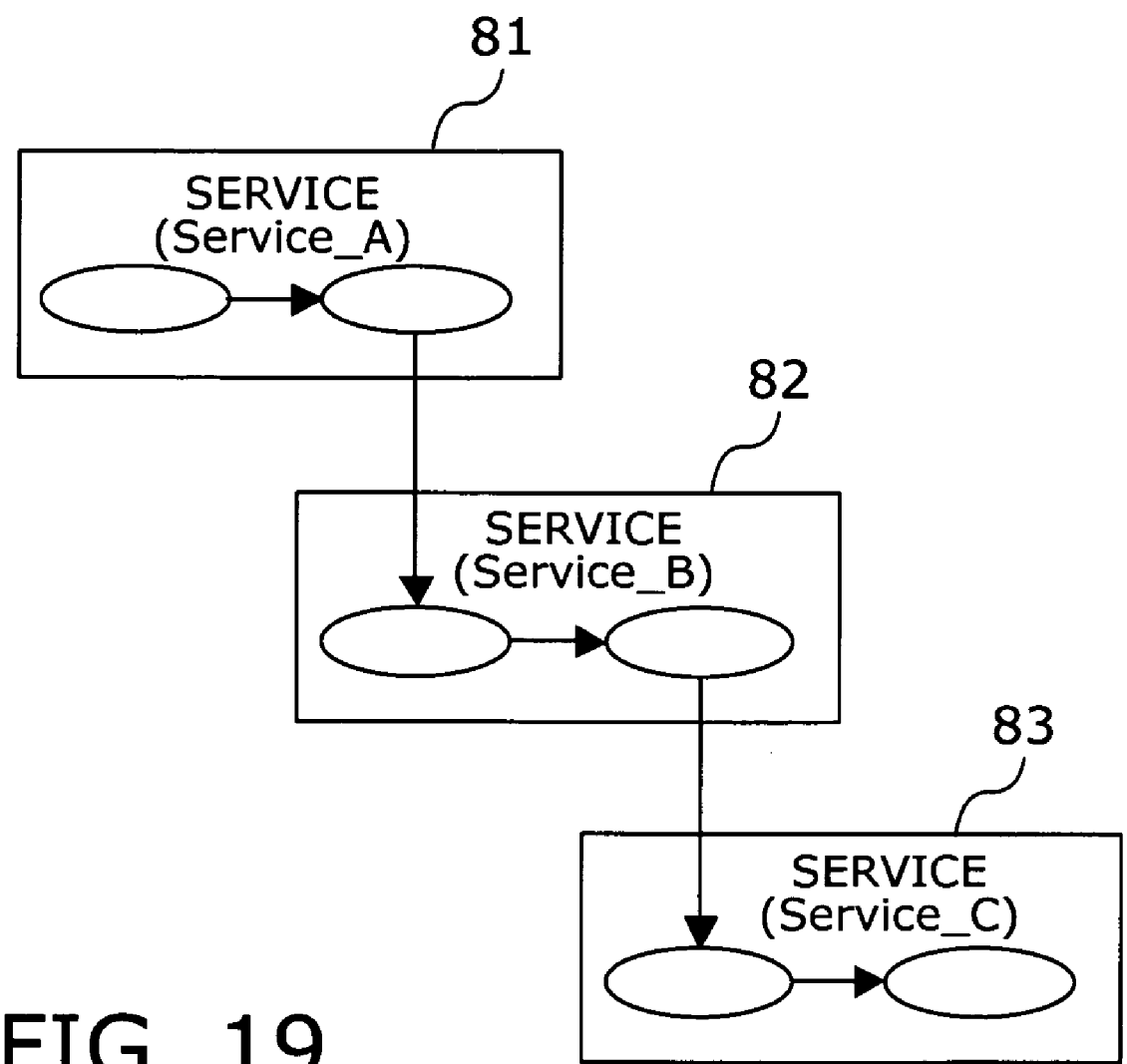
FIG. 19 shows how services are invoked according to an individual service messaging model.

This section describes a second service interface model, or individual service messaging, which is used by a service to call another service on which the invoking service directly depends. Specifically, FIG. 19 shows how services are invoked in an individual service messaging model. According to this model, service invocation takes place only between two services directly dependent on each other. In the example of FIG. 19, one service 81 named "Service_A" invokes another service 82 named "Service_B." Likewise, the service 82 invokes yet another service 83 named "Service_C." The service 81 will never call up the service 83 because of the lack of direct dependency between those two services 81 and 83.

Figure 20:
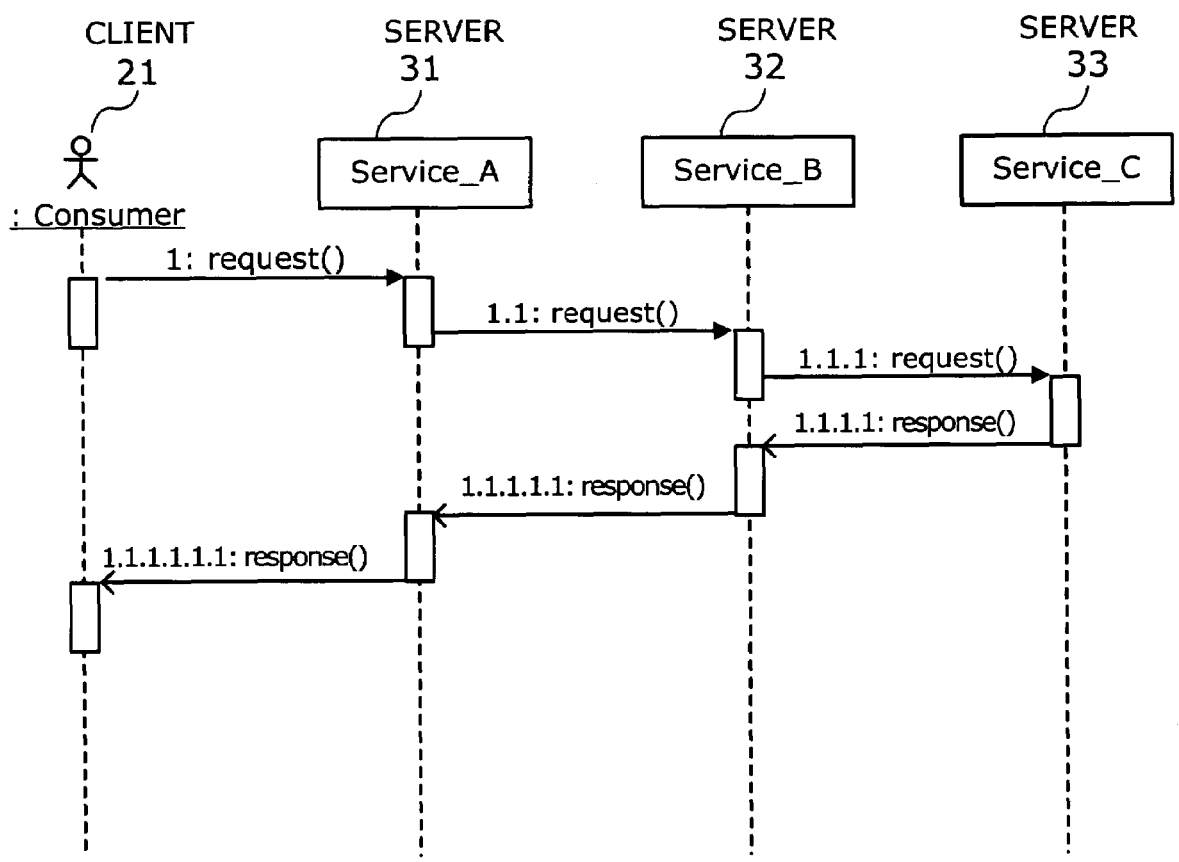
FIG. 20 shows how messages are communicated according to an individual service messaging model.

FIG. 20 shows how messages are communicated in an individual service messaging model. Specifically, a user process on the client 21 invokes a request "1: request( )" to Service_A on a first server 31. This request causes the first server 31 to start processing of Service_A. When Service_A comes to a point where Service_B is needed, the first server 31 sends a request "1.1: request( )" to a second server 32. The second server 32 thus starts Service_B, and when Service_B comes to a point where Service_C is needed, the second server 32 sends a request "1.1.1: request( )" to a third server 33. The third server 33 performs Service_C and returns a response "1.1.1.1: response( )" to Service_B on the second server 32. This response permits the second server 32 to resume Service_B and return a response "1.1.1.1.1: response( )" to Service_A on the first server 31. The response from the second server 32 causes the server 31 to continue Service_A, thus returning a response "1.1.1.1.1.1: response( )" to the requesting client 21.

The specified business process is executed in this way, by coordinating distributed services according to an individual service messaging model. This service interface permits business applications to share some of their services.

Figure 21:
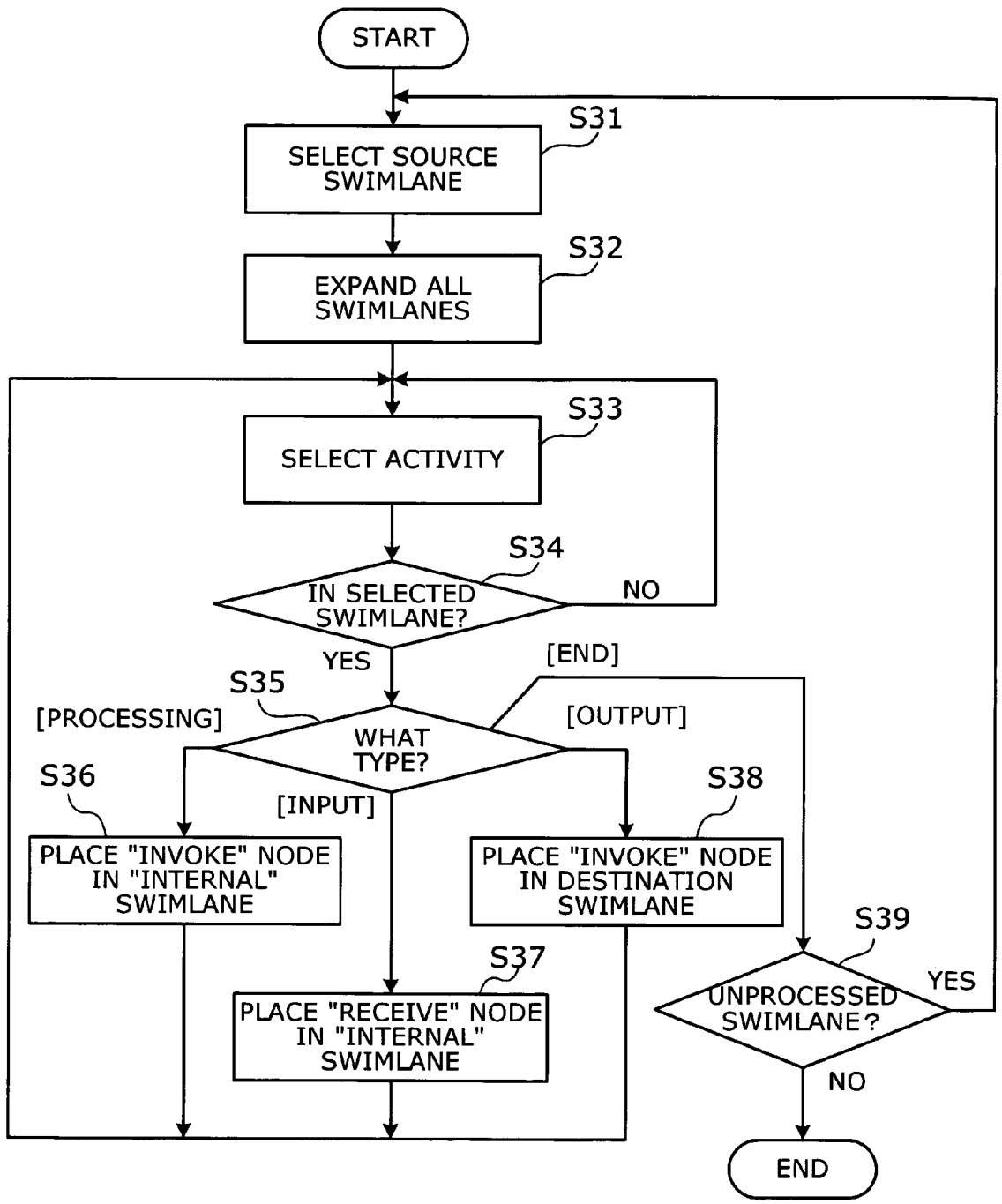
FIG. 21 is a flowchart of a process of generating an execution flow according to an individual service messaging model.

Referring now to a flowchart of FIG. 21, a process of generating an execution flow according to an individual service messaging model will be described below. As FIG. 21 shows, this process proceeds in the following steps:

(Step S31) The second execution flow generator 123 selects a swimlane from among those in the business process model 50 to create a corresponding service execution flow. This execution flow has swimlanes corresponding to those of the source business process model 50. Of all swimlanes of the execution flow, the one containing a start node is named "internal" to indicate that it is an internal service of the selected swimlane.

(Step S32) The second execution flow generator 123 expands all swimlanes of the execution flow by adding interface elements representing invocation relationships between swimlanes in the business process model 50. See FIG. 9 for a specific example of such an expanded business process model.

(Step S33) The second execution flow generator 123 traces activities from the start node and selects an activity for subsequent processing.

(Step S34) The second execution flow generator 123 determines whether the selected activity is in the swimlane of interest (i.e., the swimlane selected at step S31). If so, the process advances to step S35. If not, the process returns to step S33 to select another activity.

(Step S35) The second execution flow generator 123 identifies the type of the selected activity. If the activity type is "processing," the process advances to step S36. If it is "input," the process advances to step S37. If it is "output," the process advances to step S38. If it is "end," the process advances to step S39.

(Step S36) For the "processing" activity, the second execution flow generator 123 places an "invoke" node in the "internal" swimlane of the execution flow corresponding to the selected swimlane. The process then goes back to step S33.

(Step S37) For the "input" activity, the second execution flow generator 123 places a "receive" node in the "internal" swimlane of the execution flow corresponding to the selected swimlane. The process then goes back to step S33.

(Step S38) For the "output" activity, the second execution flow generator 123 places an "invoke" node in the destination swimlane of output data in the execution flow corresponding to the selected swimlane. The process then goes back to step S33.

(Step S39) For the "end" activity, the second execution flow generator 123 determines whether it has finished all swimlanes of the business process model 50. If there is any unfinished swimlane, the process returns to step S31 to select it. The process is completed when all swimlanes have been finished.

The following subsection will describe a specific example of how to create execution flows according to an individual service messaging model. The description assumes the same business process model 50 as discussed in FIG. 8.

Suppose that the second execution flow generator 123 has selected first a swimlane 50a of Service_A and expanded the source business process model 50. With the resulting expanded business process model 60 of FIG. 9, the second execution flow generator 123 now attempts to produce an execution flow for the selected swimlane 50a.

Figure 22:
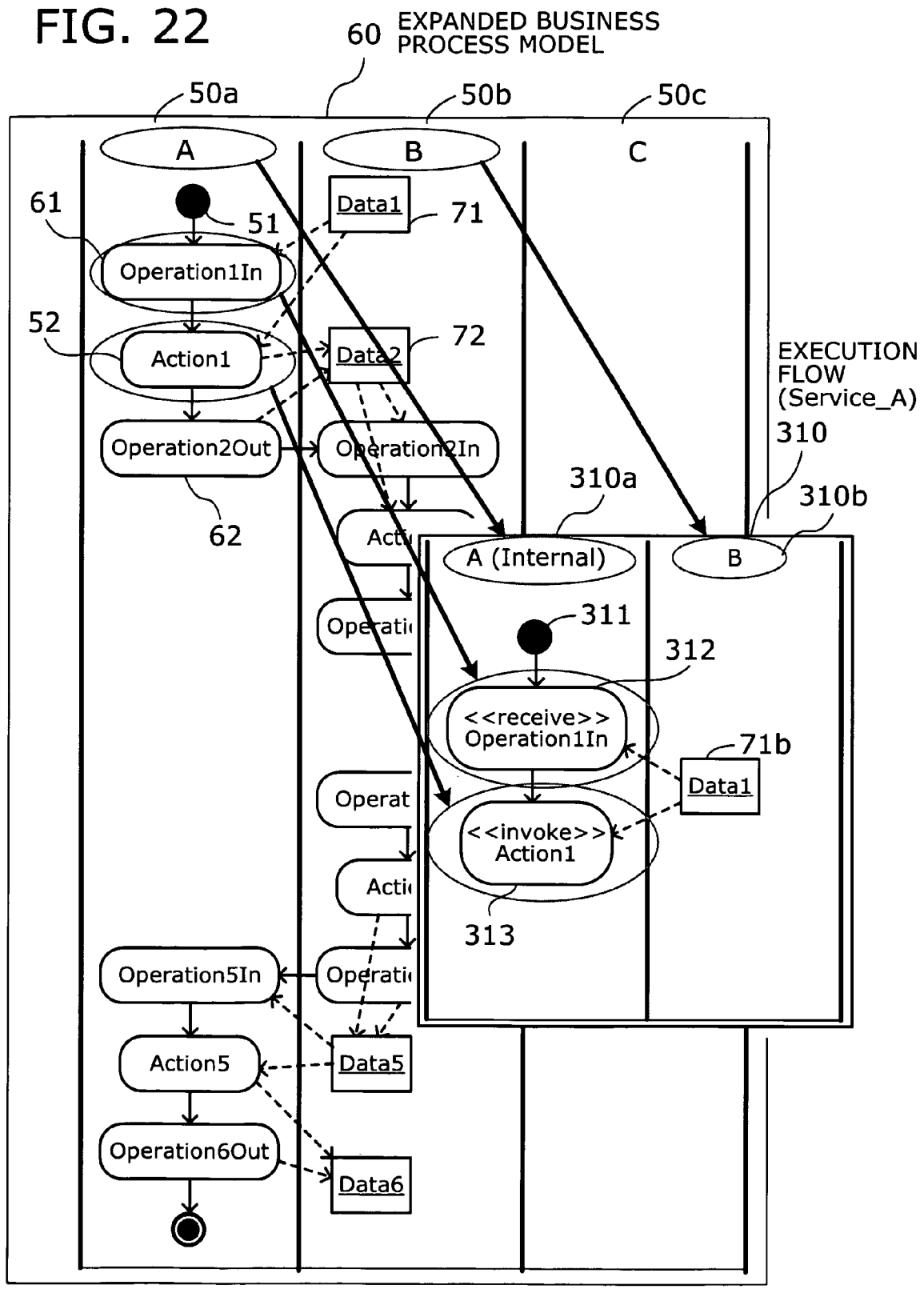
FIGS. 22 to 25 are first to fourth diagrams showing a process of generating a Service_A execution flow.

FIG. 22 is a first diagram showing a process of creating a Service_A execution flow. The created execution flow 310 has two swimlanes 310a and 310b. The leftmost swimlane 310a is designated as an "internal" swimlane since it corresponds to the swimlane 50a that the second execution flow generator 123 has selected from among those of the expanded business process model 60. A start node 311 is placed in this "internal" swimlane 310a. The second swimlane 310b at the right of the execution flow 310 corresponds to another swimlane 50b of the expanded business process model 60, which is directly associated with the swimlane 50a. The execution flow 310, when completed, will be deployed in a server. Its "internal" swimlane 310a is supposed to be executed by that server itself.

Leaving the start node 51, the second execution flow generator 123 selects activity nodes one by one, while adding new elements to the execution flow 310 each time a newly selected node is processed. Since the first node 61 after the start node 51 represents an "input" activity, the second execution flow generator 123 places a "receive" node 312 in the "internal" swimlane 310a of the execution flow 310. Selected next is a node 52 for a "processing" activity. An "invoke" node 313 is thus added to the "internal" swimlane 310a. Also added is a data element 71b passed from the source node 312 to the destination node 313. This data element 71b corresponds to data 71 in the expanded business process model 60.

Figure 23:
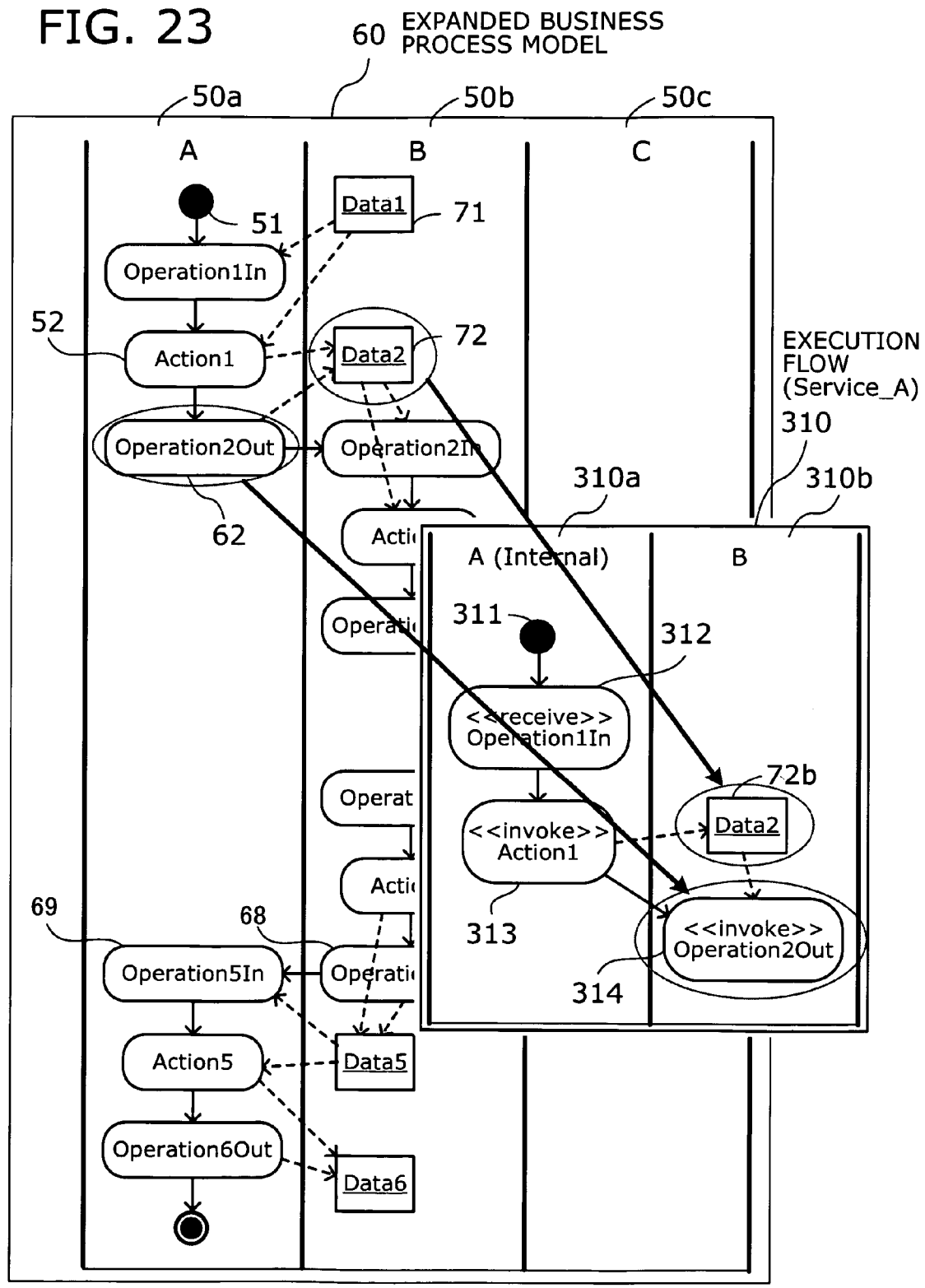

The next node 62 in the currently selected swimlane 50a represents an "output" activity (i.e., interface for sending parameters to another service). This node 62 therefore necessitates adding a new node in the destination swimlane 310b. FIG. 23 is a second diagram showing the process of creating a Service_A execution flow. Specifically, an "invoke" node 314 has been added to the second swimlane 310b of the execution flow 310. Also added is a data element 72b passed from the source node 313 to the destination node 314. This data element 72b corresponds to data 72 used in the expanded business process model 60 as parameters for an invoked service.

Referring to the expanded business process model 60, the above-described node 62 in the currently selected swimlane 50a is followed by subsequent nodes 63 to 68 in other swimlanes. Those nodes 63 to 68 do not affect the execution flow 310 under construction since they reside in non-selected swimlanes. The next node 69, however, returns to the selected swimlane 50a. Since it represents an "input" activity (i.e., interface for receiving a return value from another service), the second execution flow generator 123 adds a corresponding new node to the "internal" swimlane 310a of the execution flow 310.

Figure 24:
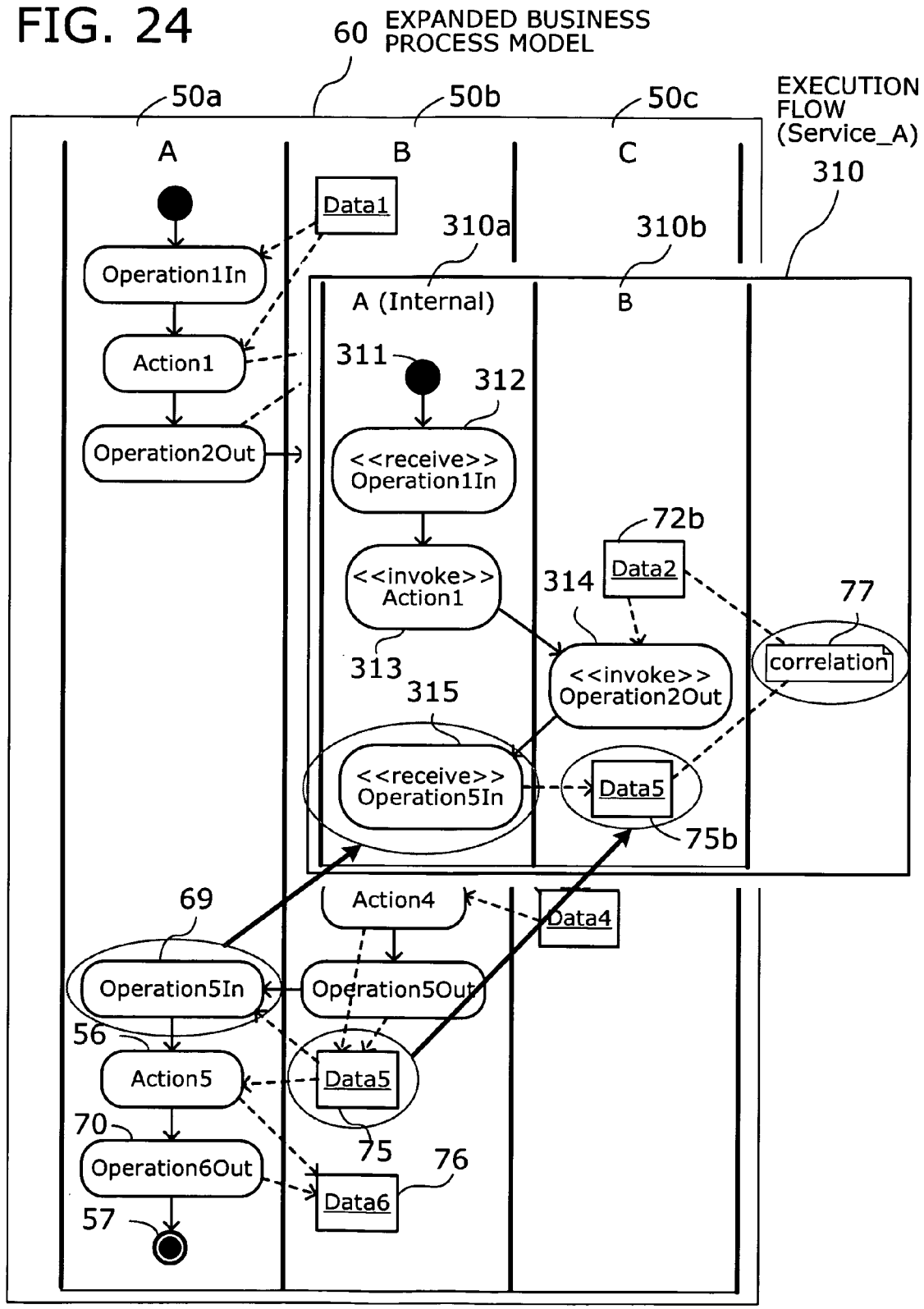

FIG. 24 is a third diagram showing the process of generating a Service_A execution flow. Specifically, a "receive" node 315 has been added to the first swimlane 310a of the execution flow 310. Note that the "invoke" node 314 in the second swimlane 310b represents all subordinate services (i.e., nodes 63 to 68 in the expanded business process model 60) invoked from Service_A. For this reason, the execution flow 310 includes a solid arrow drawn from the node 314 to the node 315.

Another added element is an output data element 75b of the node 315, which corresponds to input data 75 for the node 69 in the expanded business process model 60. Also added to the execution flow 310 is a correlation indicator 77 indicating the relationship between two data elements 72b and 75b. Note that the data elements 72b and 75b are a request and a response, respectively, when they are viewed from the "invoke" node 314 in the second swimlane 310b.

The second execution flow generator 123 then turns to nodes 56 and 70 to determine how to reflect them in the execution flow 310 under construction. The node 70 is an interface for sending a return value to the requesting client 21. The current state of the execution flow 310 shown in FIG. 24, however, has no swimlane for the client 21. The second execution flow generator 123 therefore adds a new swimlane to the execution flow 310 to accommodate an "invoke" node corresponding to the "output" node 70.

Figure 25:
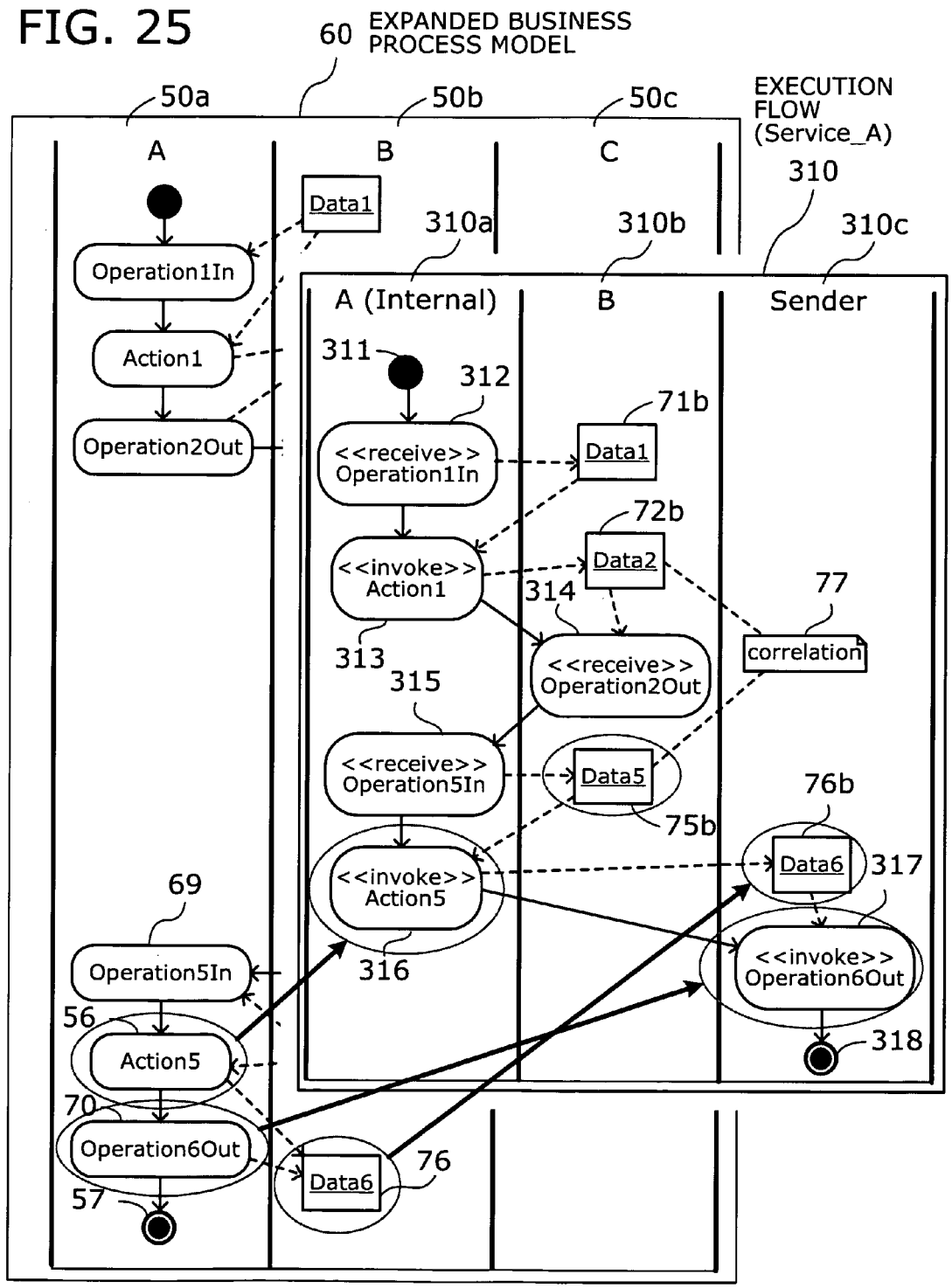

FIG. 25 is a fourth diagram showing the process of generating a Service_A execution flow. This new state of the execution flow 310 includes an "invoke" node 316 in the "internal" swimlane 310a, which corresponds to the "processing" activity node 56 in the expanded business process model 60. A new swimlane 310c is added to accommodate elements related to the "output" activity node 70. This swimlane 310c defines a service named "Sender" for interacting with the requesting entity. Specifically, the new swimlane 310c contains an "invoke" node 317 before an end node 318. Also added is a data element 76b passed from the source node 316 to the destination node 317. This data element 76b represents output data 76 of the node 70 in the expanded business process model 60.

Now that the Service_A execution flow 310 is completed in the above way, the second execution flow generator 123 creates a Service_B execution flow with reference to the second swimlane 310b, and then a Service_C execution flow with reference to the third swimlane 310c.

Figure 26:
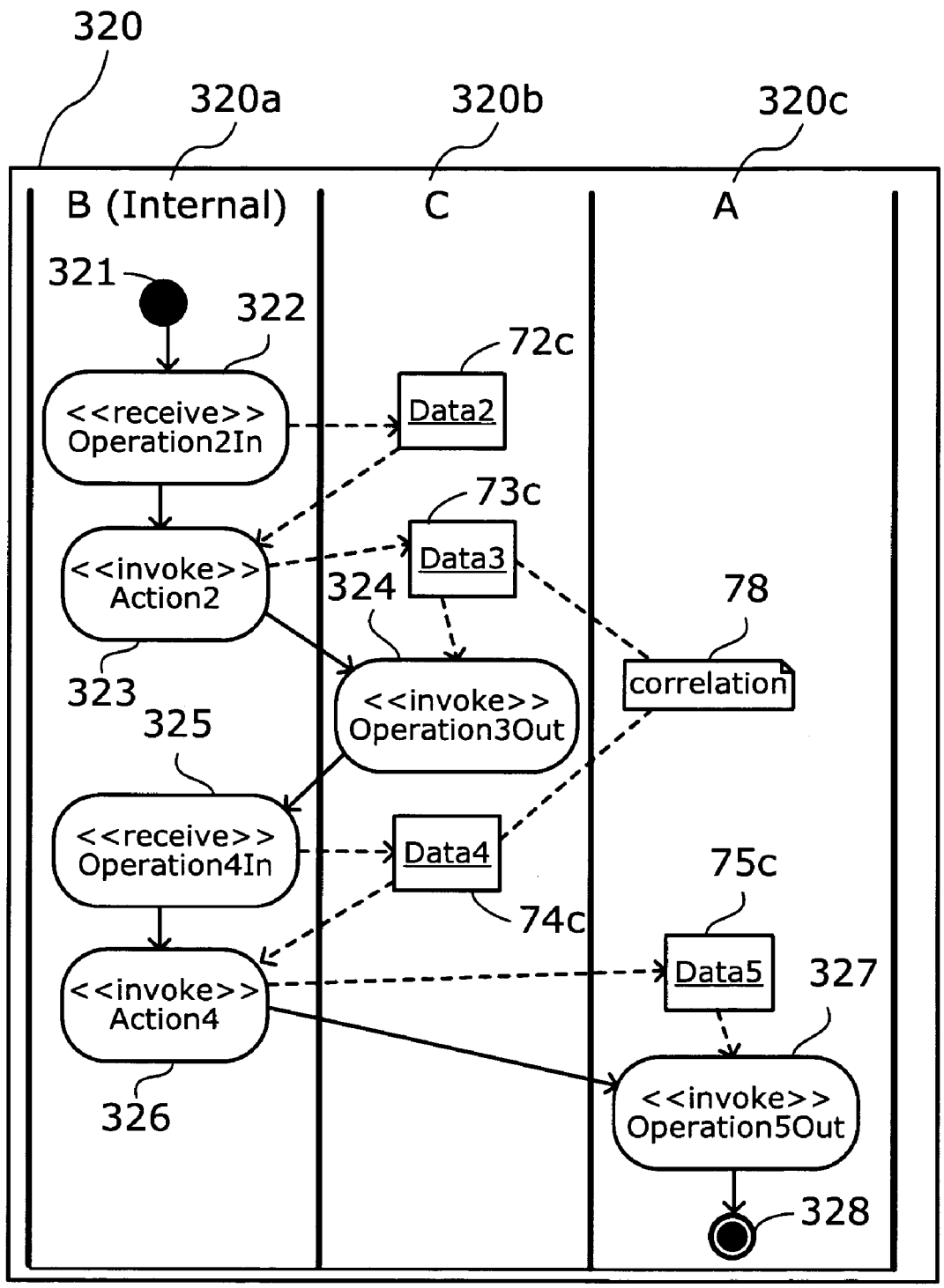
FIG. 26 shows an execution flow created for Service_B.

FIG. 26 shows an execution flow created for Service_B. This execution flow 320 has been created from the second swimlane 50b of the expanded business process model 60 (see FIG. 9), and its swimlane 320a representing Service_B is therefore designated as the "internal swimlane." Referring to the expanded business process model 60, the Service_B swimlane 50b interacts directly with both Service_A and Service_C swimlanes 50b and 50c. Accordingly the execution flow 320 has two corresponding swimlanes 320b and 320c for Service_C and Service_A, respectively.

The "internal" swimlane 320a contains a start node 321, which is followed by a "receive" node 322 corresponding to the node 63 of the expanded business process model 60. Connected to this node 322 is an "invoke" node 323 representing the node 53 of the expanded business process model 60. The node 322 supplies a data element 72c to the node 323, which corresponds to input data 72 of the node 63 in the expanded business process model 60.

The node 323 is linked to its next node 324 representing an "invoke" activity, which corresponds to the node 64 of the expanded business process model 60. This "invoke" node 324 is placed in the Service_C swimlane 320b and receives a data element 73c from its preceding node 323. The data element 73c corresponds to output data 73 of the node 64 in the expanded business process model 60.

Connected to the node 324 is a "receive" node 325 corresponding to the node 67 in the expanded business process model 60. node 67. This node 325 lies in the "internal" swimlane 320a and leads to a subsequent "invoke" node 326 corresponding to the node 55 in the expanded business process model 60. The node 326 receives a data element 74c from its preceding node 325. The data element 74c corresponds to input data 74 to the node 67 in the expanded business process model 60. Also added to the execution flow 320 is a correlation indicator 78 indicating the relationship between the request data elements 73c and the response data element 74c.

The node 326 is linked to its subsequent "invoke" node 327 corresponding to the node 68 in the expanded business process model 60. This node 327 lies in the Service_A swimlane 320c and receives a data element 75c from its preceding node 326. The data element 75c corresponds to output data 75 of the node 68 in the expanded business process model 60. The execution flow 320 finishes at an end node 328 that follows the node 327.

Figure 27:
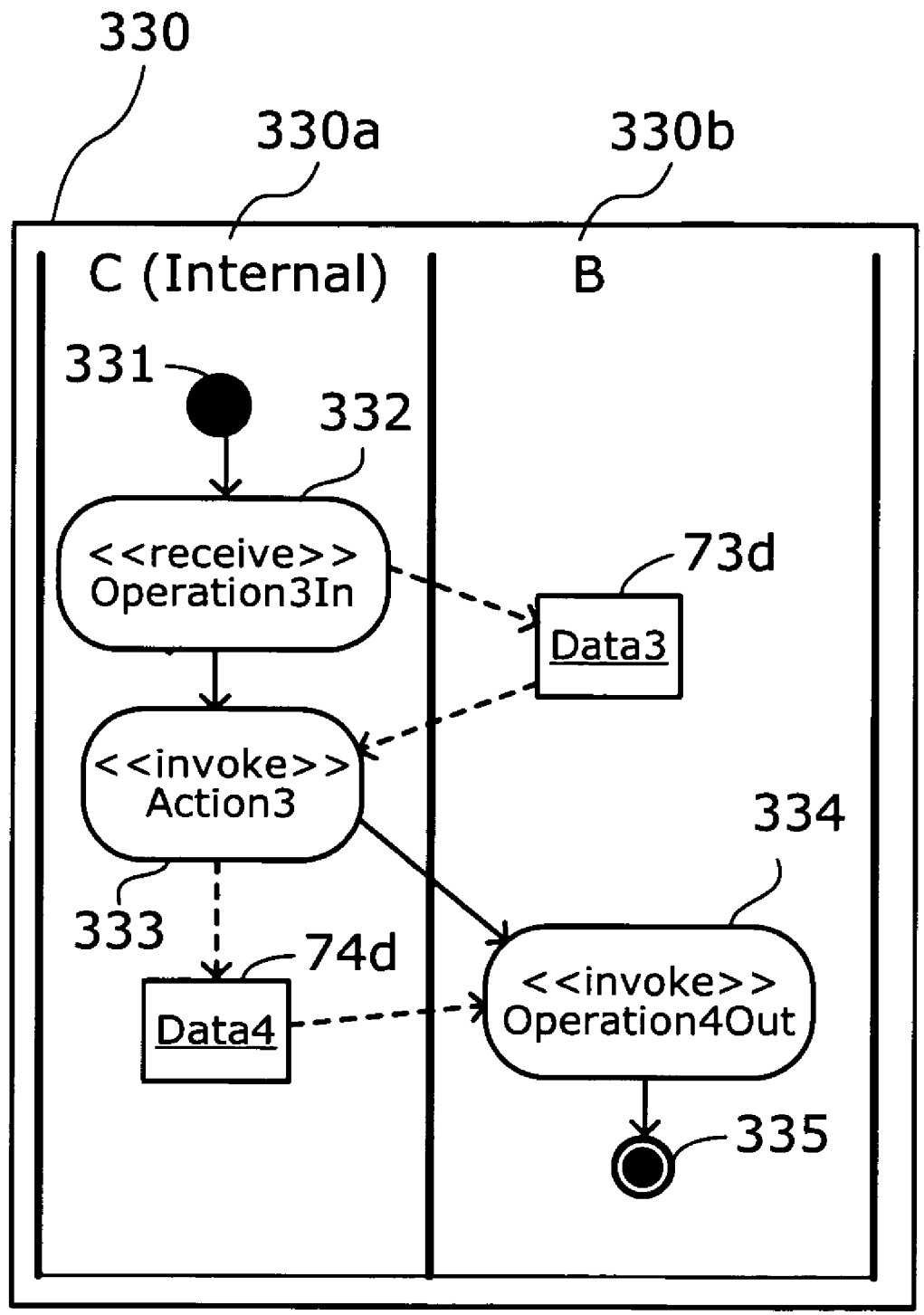
FIG. 27 shows an execution flow created for Service_C.

FIG. 27 shows an execution flow created for Service_C. This execution flow 330 has been created from the third swimlane 50c of the expanded business process model 60 (see FIG. 9), and its swimlane 330a representing Service_C is therefore designated as the "internal swimlane." Referring to the expanded business process model 60, the Service_C swimlane 50c directly interacts with the Service_B swimlane 50b. Accordingly the execution flow 330 has a corresponding swimlane 330b for Service_B.

The "internal" swimlane 330a contains a start node 331, which is followed by a "receive" node 332 corresponding to the node 65 in the expanded business process model 60. The node 332 is linked to its subsequent "invoke" node 333 corresponding to the node 54 in the expanded business process model 60. The node 333 receives a data element 73d from its preceding node 332, which corresponds to input data 73 given to the node 65 in the expanded business process model 60.

The node 333 is followed by a subsequent "invoke" node 334 corresponding to the node 66 in the expanded business process model 60. This node 334 lies in the Service_B swimlane 330b and receives a data element 74d from its preceding node 333. The data element 74d corresponds to output data 74 of the node 66 in the expanded business process model 60. The execution flow 330 finishes at an end node 335 that follows the node 334.

The above-described process creates multiple execution flows 310, 320, and 330 to define each of the services organized according to an individual service messaging model. The Service_A execution flow 310 is deployed on a server 31 to provide a service 81 of Service_A shown in FIG. 19. Also, the execution flow 320 is deployed on another server 32 to provide a service 82 of Service_B. The execution flow 330 is deployed on yet another server 33 to provide a service 83 of Service_C.

Third Service Interface Model

This section describes an individual service pub/sub model in which a service is allowed to call another service using publish/subscribe (pub/sub) models when the invoking service directly depends on the invoked service. The procedure for creating an execution flow with an individual service pub/sub model is similar to that in the foregoing second service interface model. The difference is that a pub/sub program model is specified, instead of an asynchronous messaging model, when a node is placed in the execution flow to implement a communication interface.

The following example of an execution flow uses the individual service pub/sub model for interaction between Service_A and Service_B and the individual service messaging model for interaction between Service_B and Service_C.

Figure 28:
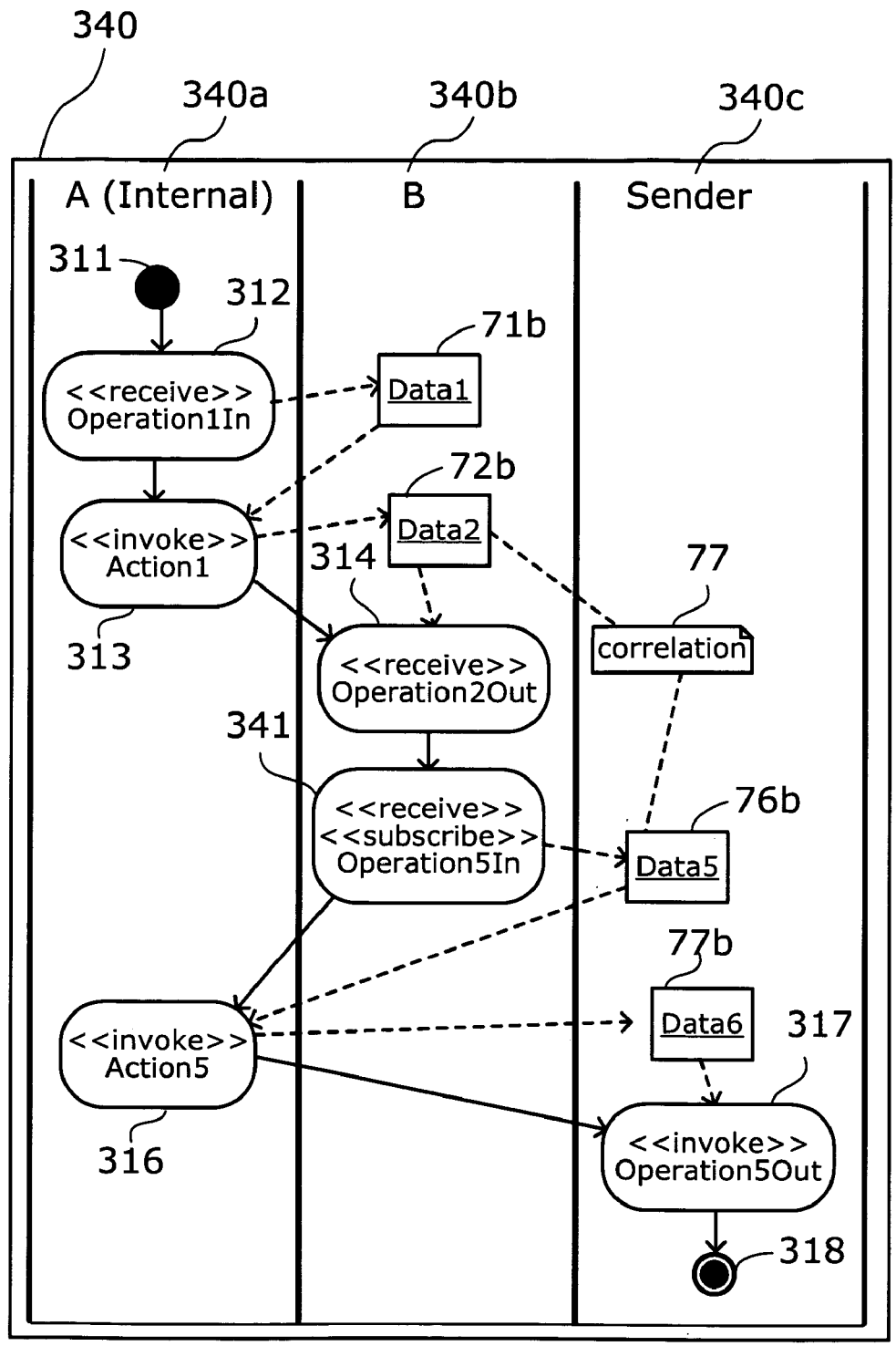
FIG. 28 shows a Service_A execution flow created according to a third service interface model.

FIG. 28 shows an execution flow created for Service_A in a third service interface model. This execution flow 340 has been created from the first swimlane 50a of the expanded business process model 60 (see FIG. 9), and its swimlane 340a representing Service_A is therefore designated as the "internal swimlane." Referring to the expanded business process model 60, the Service_A swimlane 50a directly interacts with the Service_B swimlane 50b. Accordingly the execution flow 340 has a corresponding swimlane 340b for Service_B. Also, since the Service_A swimlane 50a contains an action of returning a response to the requesting client 21, the execution flow 340 has a "sender" swimlane 340c corresponding that client 21.

The resulting execution flow 340 has nearly the same set of nodes and data elements as the foregoing execution flow 310 (see FIG. 25) created according to the second service interface model. The following section will not repeat the explanation for the same elements as those in FIG. 25, but, concentrate on the difference from the execution flow 310 while affixing like reference numerals to like elements.

The execution flow 340 according to the second service interface model is different from the foregoing execution flow 310 in that a "subscribe" node 341 is inserted in place of the "receive" node 315 of the execution flow 310. This node 341, derived from the "input" node 69 (see FIG. 9), contains a "subscribe" function to communicate with the destination by using pub/sub messaging.

Figure 29:
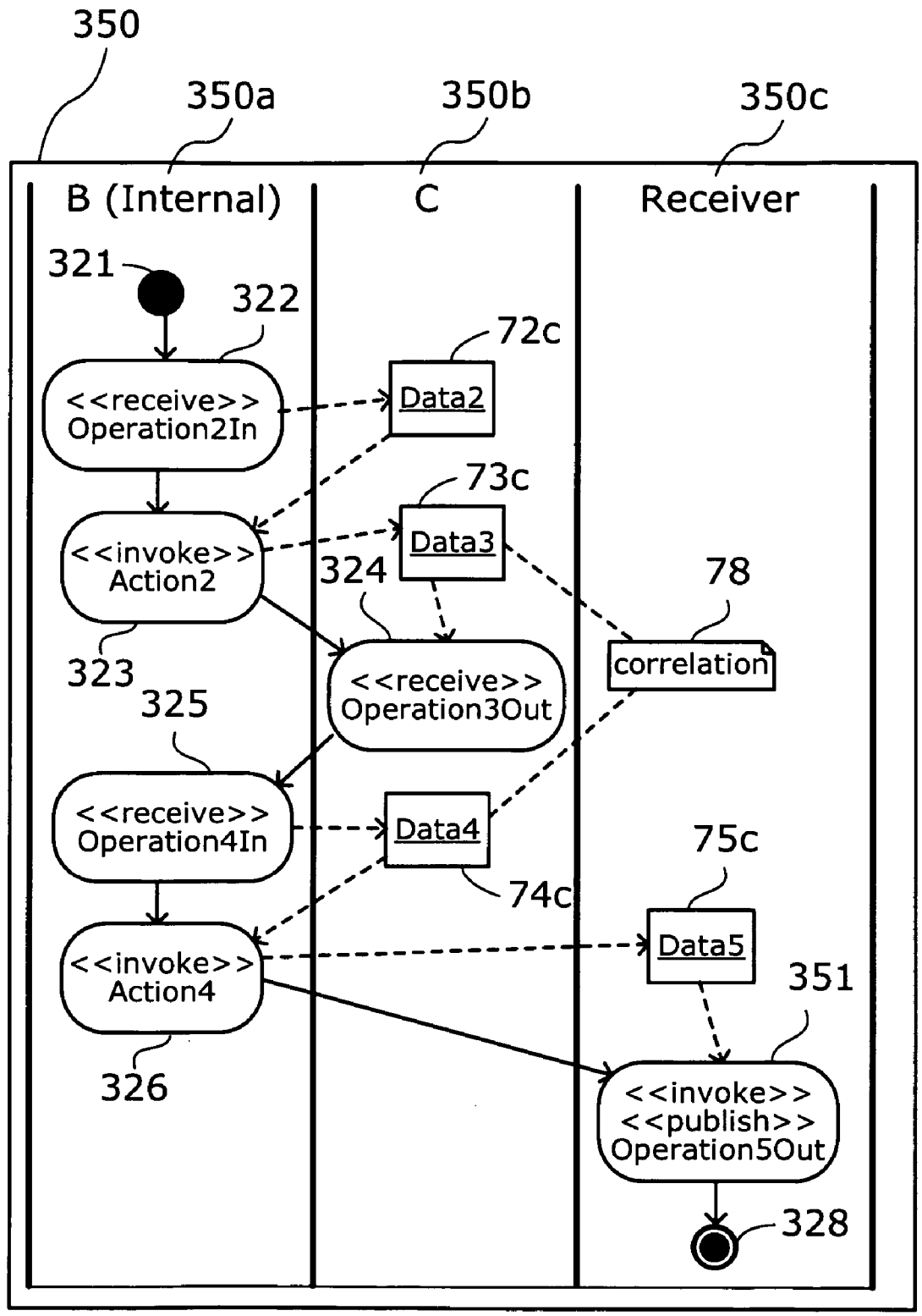
FIG. 29 shows a Service_B execution flow created according to the third service interface model.

FIG. 29 shows a Service_B execution flow created according to the third service interface model. This execution flow 350 has been created from the Service_B swimlane 50b of the expanded business process model 60 (see FIG. 9), and its leftmost swimlane 350*a* representing Service_B is therefore designated as the "internal swimlane." Referring to the expanded business process model 60, the Service_B swimlane 50*b* interacts directly with both Service_A and Service_C swimlanes 50*b* and 50*c*. Accordingly the execution flow 350 has two corresponding swimlanes 350*b* and 350*c* for Service_C and Service_A, respectively. It should be noted, however, that the third swimlane 350*c* is titled, not "Service_A," but "Receiver" because the pub/sub messaging does not allow the sender of a message (i.e., Service_B in the present case) to know the name of its recipient until a specific send request arises for that message.

The resulting execution flow 350 has nearly the same set of nodes and data elements as the foregoing execution flow 320 (see FIG. 26) created according to the second service interface model. For this reason, the following section will not repeat the explanation for the same elements as those in FIG. 26, but concentrate on the difference from the execution flow 320 while affixing like reference numerals to like elements.

The execution flow 350 according to the third service interface model is different from the foregoing execution flow 320 of the second service interface model in that a "publish" node 351 is inserted in place of the "invoke" node 327 of the execution flow 320. This node 351, derived from the "output" node 68 (see FIG. 9), contains a "publish" function to send a message according to the pub/sub messaging model.

Regarding Service_C, the use of the third service interface model results in the same execution flow as the execution flow 330 of the second service interface model. See FIG. 27 for details of the execution flow.

The above-described process creates multiple execution flows 340, 350, and 330 to define each of the services organized according to an individual service pub/sub model. The Service_A execution flow 340 is deployed on a server 31 to provide Service_A to clients. Also, the execution flow 350 is deployed on another server 32 to provide Service_B to Service_A. The execution flow 330 is deployed on yet another server 33 to provide a service 83 of Service_C to Service_B.

The first server 31 interacts with the second server 32 using a pub/sub messaging technique. The use of a pub/sub service interface makes it easy to, for example, add or discard a server for Service_A. More specifically, a new server for Service_A can be added to the system by simply deploying the Service_A execution flow 340 in that server, without the need for modifying the existing Service_B execution flow 350 on the second server 32.

Fourth Service Interface Model

Figure 30:
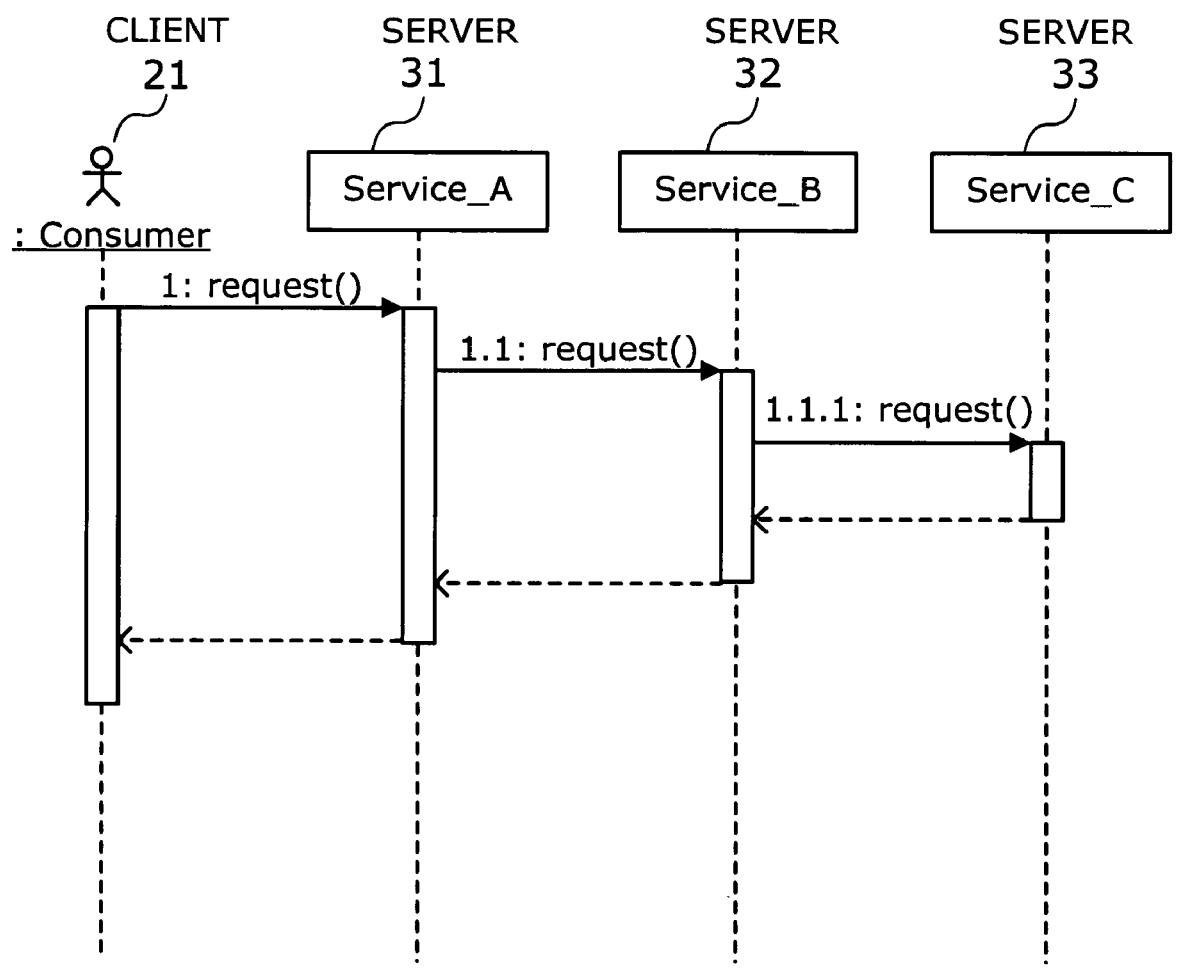
FIG. 30 shows how messages are communicated in the case of individual service RPC.

This section describes a fourth service interface model, or individual service RPC, which is used by a service to call another service on which the invoking service directly depends. Specifically, FIG. 30 shows how messages are communicated in the case of individual service RPC.

In this model, a user process on the client 21 invokes a request "1: request( )" to Service_A on a first server 31, This request causes the first server 31 to start processing of Service_A. When Service_A comes to a point where Service_B is needed, the first server 31 sends a request "1.1: request( )" to a second server 32. The requesting server 31 then enters a wait state until a response is returned from the second server 32.

The second server 32 thus starts Service_B, and when Service_B comes to a point where Service_C is needed, the second server 32 sends a request "1.1.1: request( )" to a third server 33. The requesting second server 32 then enters a wait state until a response is returned from the third server 33. The third server 33 performs Service_C and returns a response to Service_B on the second server 32. This response from the third server 33 causes the second server 32 to resume the Service_B processing, finally returning a response to the requesting first server 31. The response from the second server 32 permits the first server 31 to resume the Service_A processing, thus permitting the client 21 to receive a response.

The specified business process is executed in this way, by coordinating distributed services according to an individual service RPC model. This service interface is advantageous when realtime response is required or when asynchronous messaging is not necessary.

Figure 31:
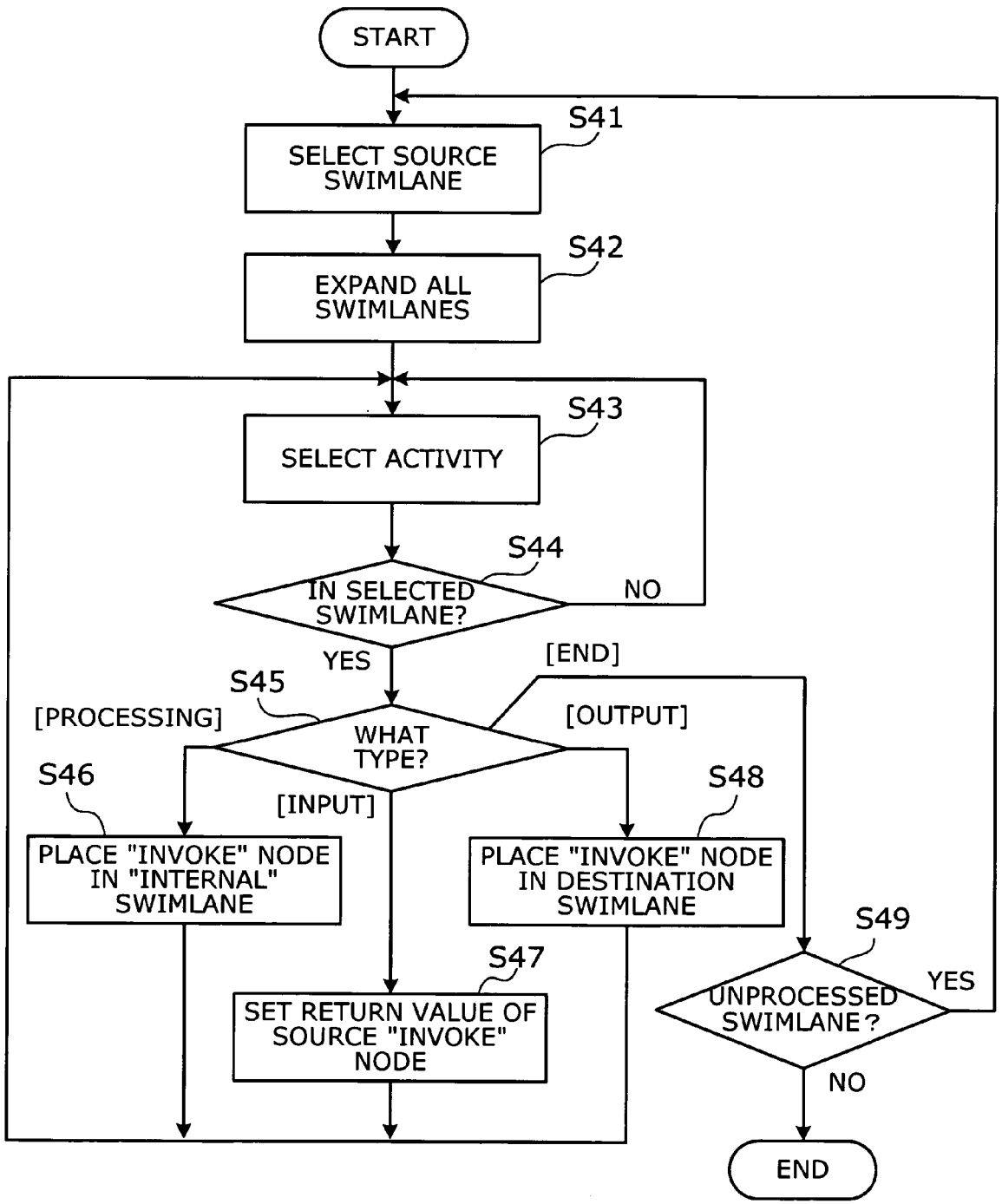
FIG. 31 is a flowchart of a process of generating an execution flow according to an individual service RPC model.

Referring now to a flowchart of FIG. 31, a process of generating an execution flow according to an individual service RPC model will be described below. As FIG. 31 shows, this process proceeds in the following steps:

(Step S41) The fourth execution flow generator 125 selects a swimlane from among those in the business process model 50 to create a corresponding service execution flow. This execution flow has swimlanes corresponding to those of the source business process model 50. Of all swimlanes of the execution flow, the one containing a start node is named "internal" to indicate that it is an internal service of the selected swimlane.

(Step S42) The fourth execution flow generator 125 expands all swimlanes of the execution flow by adding interface elements representing invocation relationships between swimlanes in the business process model 50. See FIG. 9 for a specific example of this expansion.

(Step S43) The fourth execution flow generator 125 traces activities from the start node and selects an activity for subsequent processing.

(Step S44) The fourth execution flow generator 125 determines whether the selected activity is in the swimlane of interest (the one selected at step S41). If the activity is in the swimlane of interest, the process advances to step S45. If not, the process returns to step S43 to select another activity.

(Step S45) The fourth execution flow generator 125 identifies the type of the selected activity. If it is "processing," the process advances to step S46. If it is "input," the process advances to step S47. If it is "output," the process advances to step S48. If it is "end," the process advances to step S49.

(Step S46) For the "processing" activity, the fourth execution flow generator 125 places an "invoke" node in the "internal" swimlane of the execution flow corresponding to the selected swimlane. The process then goes back to step S43.

(Step S47) For the "input" activity, the fourth execution flow generator 125 places a return value from the source "invoke" node in a swimlane corresponding to that source node. The process then goes back to step S43.

(Step S48) For the "output" activity, the fourth execution flow generator 125 places an "invoke" node in the destination swimlane of output data in the execution flow corresponding to the selected swimlane. The process then goes back to step S43.

(Step S49) For the "end" activity, the fourth execution flow generator 125 determines whether it has finished all swimlanes of the business process model 50. If there is any unfinished swimlane, the process returns to step S41 to select it. The process is complete when all swimlanes have been finished.

The following subsection will describe a specific example of how to create execution flows according to an individual service RPC model. The description assumes the same business process model 50 as discussed in FIG. 8.

Suppose that the fourth execution flow generator 125 has selected first a swimlane 50*a* of Service_A and expanded the source business process model 50. With the resulting expanded business process model 60 of FIG. 9, the fourth execution flow generator 125 now attempts to produce an execution flow for the selected swimlane 50a.

Figure 32:
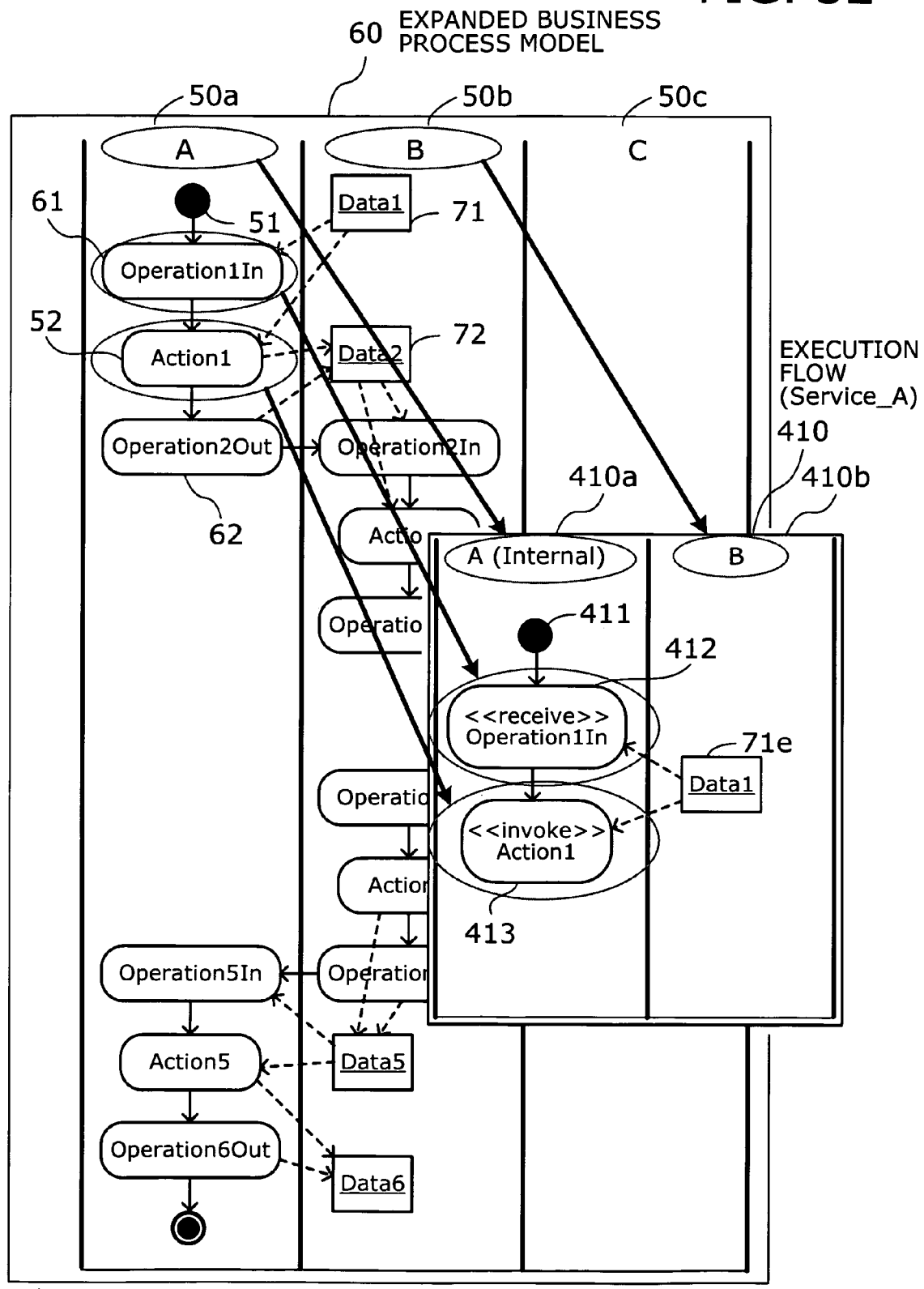
FIGS. 32 to 34 are first to third diagrams showing a process of generating a Service_A execution flow.

FIG. 32 is a first diagram showing a process of generating a Service_A execution flow. The created execution flow 410 has two swimlanes 410a and 410b. The leftmost swimlane 410a is designated as the "internal" swimlane since it corresponds to the swimlane 50a that the fourth execution flow generator 125 has selected from among those of the expanded business process model 60. A start node 411 is placed in this "internal" swimlane 410a. The second swimlane 410b at the right of the execution flow 410 corresponds to another swimlane 50b that is directly associated with the swimlane 50a. The execution flow 410, when completed, will be deployed in a server. Its "internal" swimlane 410a is supposed to be executed by that server itself.

Leaving the start node 51, the fourth execution flow generator 125 selects activity nodes one by one, while adding new elements to the execution flow 410 each time a newly selected node is processed. Since the first node 61 selected in the swimlane 50a of interest is an "input" activity node, the fourth execution flow generator 125 places a "receive" node 412 in the "internal" swimlane 410a of the execution flow 410. Selected next is a node 52 for a "processing" activity. An "invoke" node 413 is thus added to the "internal" swimlane 410a. Also added is a data element 71e passed from the preceding node 412 to the current node 413. This data element 71e corresponds to data 71 in the expanded business process model 60.

The next node 62 in the currently selected swimlane 50a represents an "output" activity (i.e., interface for sending parameters to another service). This node 62 therefore necessitates adding a new node in the destination swimlane 410b.

Figure 33:
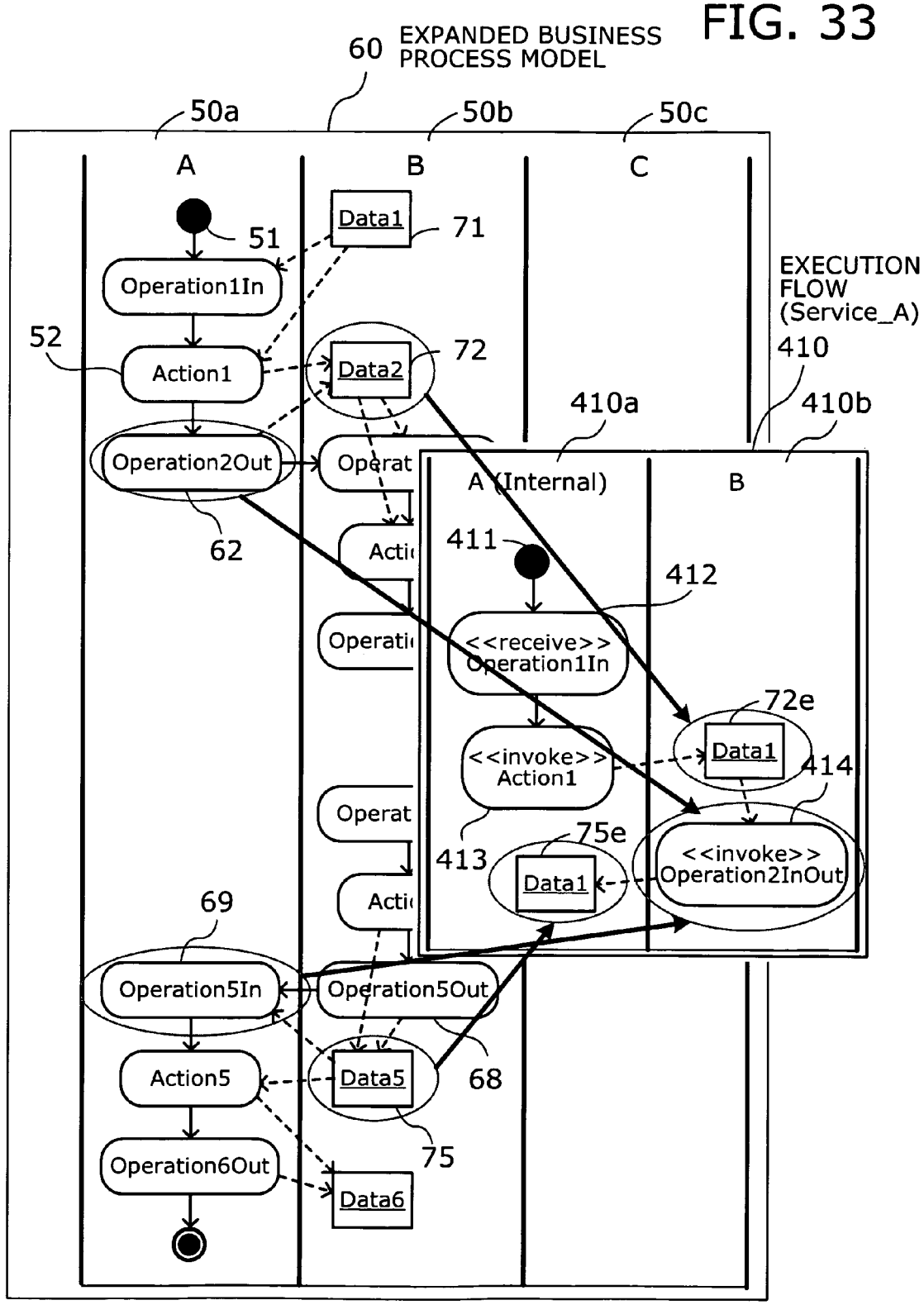

FIG. 33 is a second diagram showing the process of generating a Service_A execution flow. Specifically, an "invoke" node 414 has been added to the second swimlane 410b of the execution flow 410. Also added is a data element 72e passed from the source node 413 to the destination node 414. This data element 72e corresponds to data 72 used in the expanded business process model 60 as parameters for an invoked service.

Referring to the expanded business process model 60, the above-described node 62 in the currently selected swimlane 50a is followed by subsequent nodes 63 to 68 in other swimlanes. Those nodes 63 to 68 do not affect the execution flow 410 under construction since they reside in non-selected swimlanes. The next node 69, however, returns to the selected swimlane 50a. This node 69 is an "input" activity node, i.e., an interface for receiving a return value 75 from Service_B. Therefore the fourth execution flow generator 125 places a corresponding data element 75e as a return value from the Service_B swimlane 410b of the execution flow 410.

Figure 34:
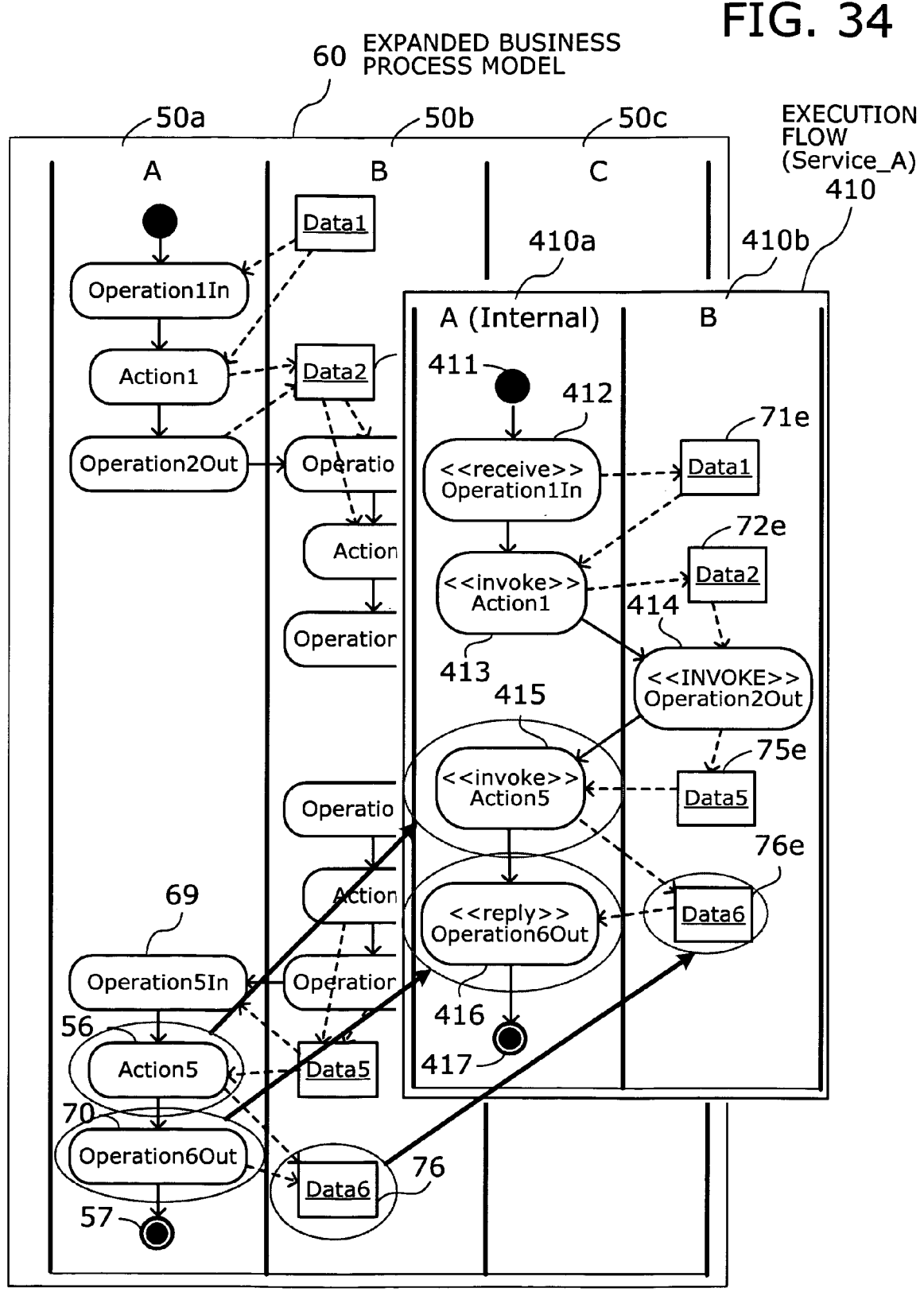

The second execution flow generator 123 then turns to nodes 56 and 70 to determine how to reflect them in the execution flow 410 under construction. FIG. 34 is a third diagram showing the process of generating a Service_A execution flow. This new state of the execution flow 410 includes an "invoke" node 415 in the "internal" swimlane 310a, which corresponds to the "processing" activity node 56 in the expanded business process model 60. Another new element is a "reply" node 416 corresponding to the "output" activity node 70 in the expanded business process model 60, which is followed by an end node 417. Also added is a data element 76e passed from the source node 415 to the destination node 416 in the execution flow 410. This data element 76e represents output data 76 of the node 70 in the expanded business process model 60.

Now that the Service_A execution flow 410 is completed in the above way, the fourth execution flow generator 125 creates a Service_B execution flow with reference to the second swimlane 410b, and then a Service_C execution flow with reference to the third swimlane 410c.

Figure 35:
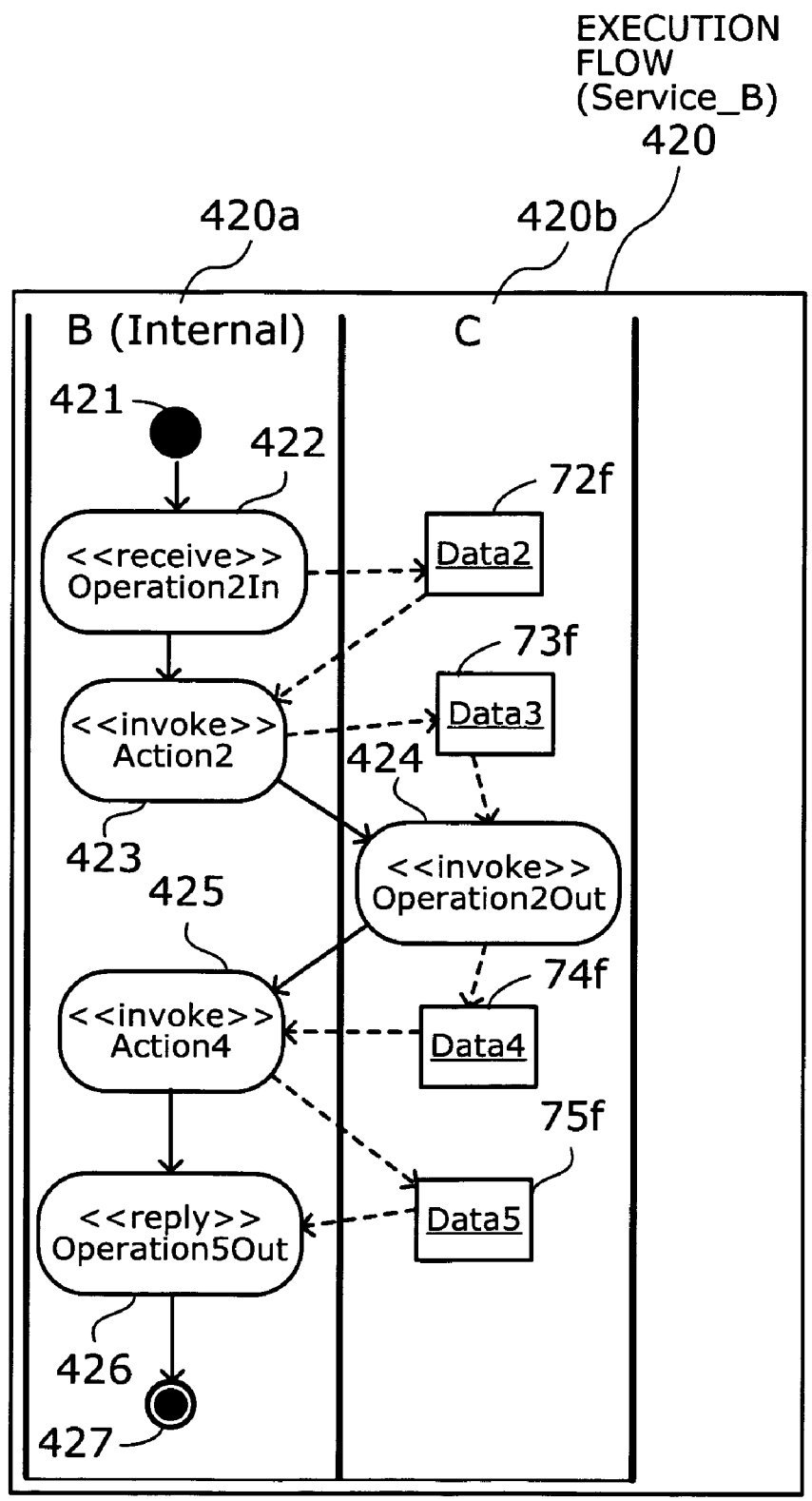
FIG. 35 shows an execution flow created for Service_B.

FIG. 35 shows an execution flow created for Service_B. This execution flow 420 has been created from the Service_B swimlane 50b of the expanded business process model 60 (see FIG. 9), and its leftmost swimlane 420a representing Service_B is therefore designated as an "internal swimlane." Referring to the expanded business process model 60, the Service_B swimlane 50b interacts directly with the Service_C swimlane 50c. Accordingly the execution flow 420 has a corresponding swimlane 420b for Service_C.

The "internal" swimlane 420a contains a start node 421, which is followed by a "receive" node 422 corresponding to the node 63 in the expanded business process model 60. The node 422 is then linked to a subsequent "invoke" node 423 corresponding to the node 53 in the expanded business process model 60. The node 423 receives a data element 72f from its preceding node 422. This data element 72f corresponds to input data 72 given to the node 63 in the expanded business process model 60.

The node 423 is linked to a subsequent "invoke" node 424 corresponding to the node 64 in the expanded business process model 60. This "invoke" node 424 is placed in the Service_C swimlane 420b and receives a data element 73f from its preceding node 423. The data element 73f corresponds to output data 73 of the node 64 in the expanded business process model 60.

Connected to the node 424 is an "invoke" node 425 corresponding to the node 55 in the expanded business process model 60. This node 425 lies in the "internal" swimlane 420a and receives a data element 74f from its preceding node 424. The data element 74f corresponds to input data 74 given to the node 55 in the expanded business process model 60.

Next to the node 425 is a "reply" node 426 corresponding to the node 68 in the expanded business process model 60. This node 426 receives a data element 75f from its preceding node 425, which corresponds to output data 73 of the node 68 in the expanded business process model 60. The execution flow 420 finishes at an end node 427 that follows the node 426.

Figure 36:
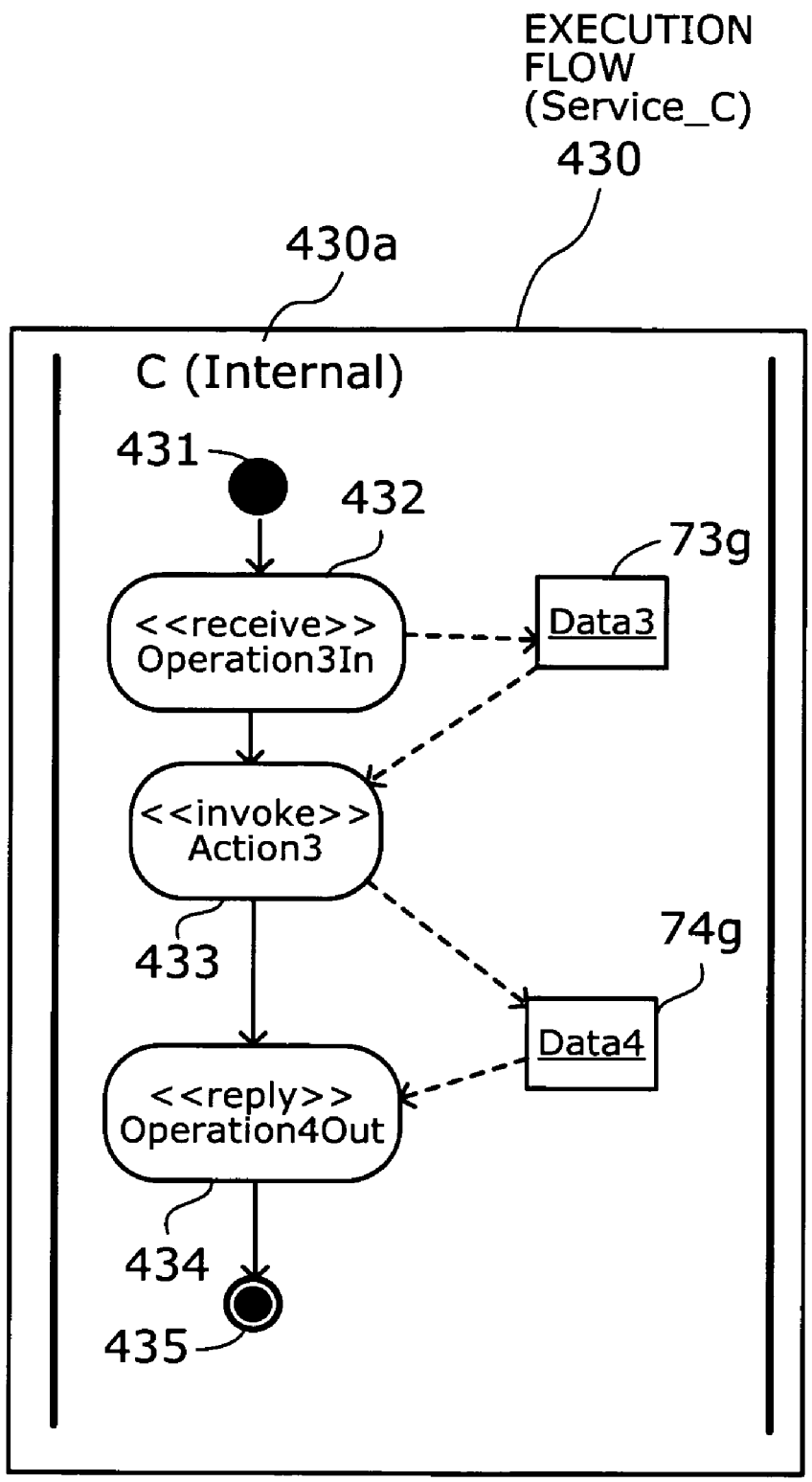
FIG. 36 shows an execution flow created for Service_C.

FIG. 36 shows an execution flow created for Service_C. This execution flow 430 has been created from the Service_C swimlane 50c of the expanded business process model 60 (see FIG. 9), and its swimlane 430a representing Service_C is therefore designated as the "internal swimlane."

The "internal" swimlane 430a contains a start node 431, which is followed by a "receive" node 432 corresponding to the node 65 in the expanded business process model 60. Connected to this node 432 is an "invoke" node 433 corresponding to the node 54 in the expanded business process model 60. This node 433 receives a data element 73g from its preceding node 432, which corresponds to input data 73 given to the node 65 in the expanded business process model 60.

Linked to the node 433 is a "reply" node 434 corresponding to the node 66 in the expanded business process model 60. This node 434 receives a data element 74g from its preceding node 433, which corresponds to output data 74 of the node 66 in the expanded business process model 60. The execution flow 430 finishes at an end node 435 that follows the node 434.

The above-described process creates multiple execution flows 410, 420, and 430 to define each of the services organized according to an individual service RPC model.

Deployment of Execution Flows

Figure 37:
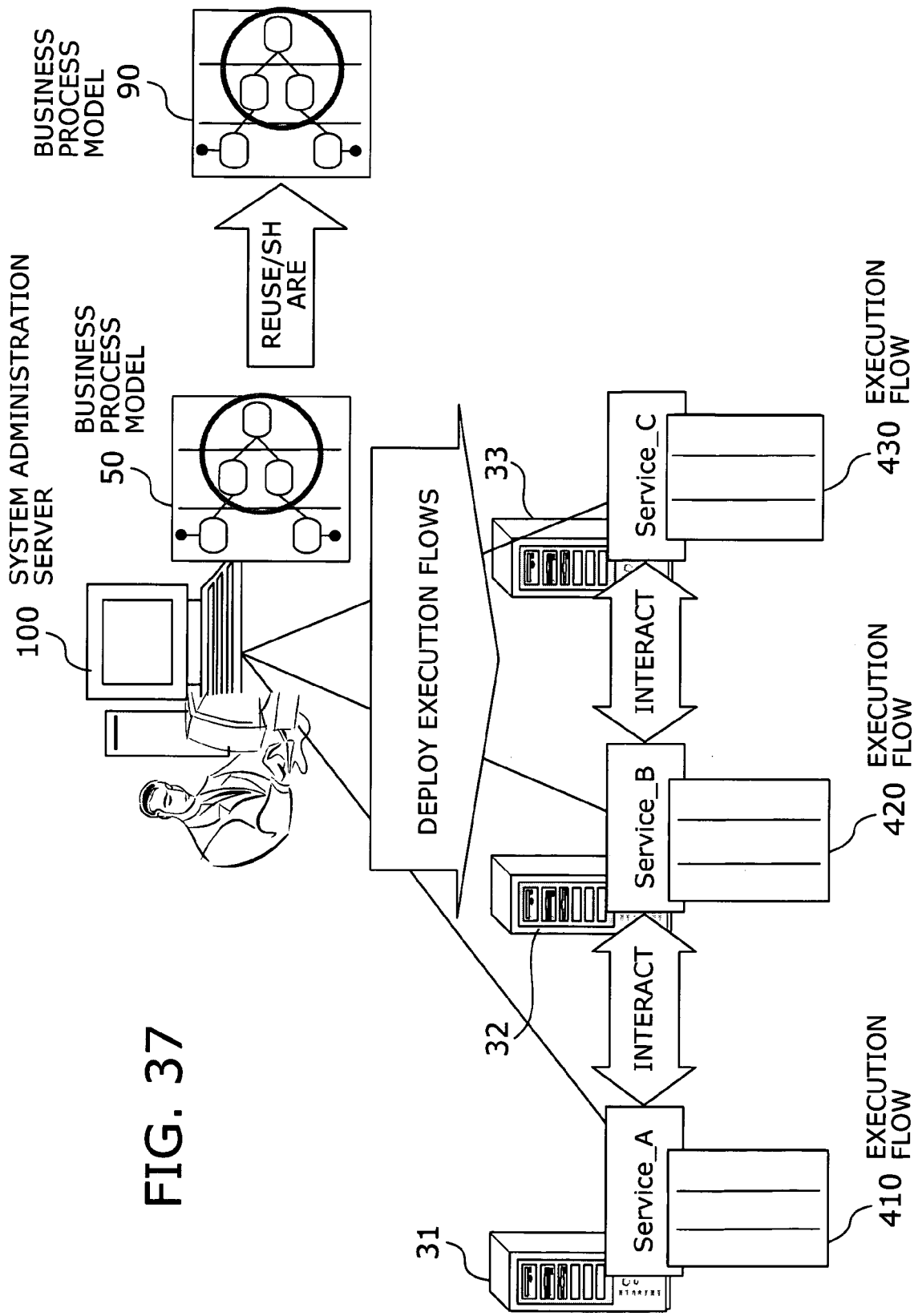
FIG. 37 shows how execution flows are deployed on servers.

FIG. 37 shows how those execution flows are deployed on servers. Specifically, a given business process model 50 is implemented as execution flows 410, 420, and 430 which interacts with each other by using an individual service RPC model. The Service_A execution flow 410 is then deployed on a server 31 to provide Service_A to clients. The execution flow 420 is deployed on another server 32 to provide Service_B to Service_A. Also, the execution flow 430 is deployed on another server 33 to provide Service_A with Service_B. Those servers 31, 32, and 33 operate together while communicating with each other according to an individual service RPC model.

The above-described embodiment makes it easy to reuse or share each service while allowing system integrators to understand the overall flow of business applications that they develop. For example, a new business process 90 can be developed by reusing a part of an existing business process model 50 and newly writing execution flows for the remaining process. The two business processes 50 and 90 can share a part of their services that has already been deployed on an existing server, thus making an efficient use of server resources.

Business processes may be described in, for example, the Unified Modeling Language (UML). Execution flows, on the other hand, may be described in, for example, the Business Process Execution Language (BPEL), in which case each server 31, 32, and 33 is only required to have a function of parsing BPEL scripts. Those servers 31, 32, and 33 may be connected through an Enterprise Service Bus (ESB) infrastructure to organize multiple services.

In defining execution flows, their input and output interfaces may not always be unified across services in terms of their protocols and message formats. If this is the case, the proposed service implementation support device may produces additional execution flows for converting protocols or message formats and deploy them as part of ESB communication functions that bind services, thereby solving the problem of interface mismatch.

As can be seen from the above explanation, the embodiment of the present invention enables a plurality of execution flows to be created for deployment on different servers from a given business process model 50 describing an overall flow of business operations across systems. This feature enables multiple services on the servers 31, 32, and 33 to work together by themselves under a prescribed overall business flow. Since it creates a separate execution flow for each individual service, the service implementation support device makes such services more reusable and sharable. The embodiment provides four options for selecting which service interface to use, making it easier to generate execution flows automatically.

As discussed in an earlier part of this description, there are three gaps between the approach of building a business process model and that of generating execution flows. The present embodiment addresses the first gap in the viewpoint on a system by producing separate execution flows for individual swimlanes. The second gap regarding service interface is solved by adding a selected type of input and output interfaces to services when expanding a given process model. The third gap about asynchronous interactions between services is addressed by indicating relationships between messages, besides adding activities in an execution flow for receiving an asynchronous request.

Computer-readable Media

The above-described processing mechanisms of the present invention are actually implemented on a computer system, the instructions being encoded and provided in the form of computer programs. A computer system executes such programs to provide the intended functions of the present invention. For the purpose of storage and distribution, the programs may be stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available on a server computer for downloading to other computers via a network.

A user computer stores necessary software components in its local storage unit, which have previously been installed from a portable storage media or downloaded from a server computer. The computer executes those programs read out of the local storage unit, thereby performing the programmed functions. As an alternative way of program execution, the computer may execute programs, reading program codes directly from a portable storage medium. Another alternative method is that the user computer dynamically downloads programs from a server computer when they are demanded and executes them upon delivery.

CONCLUSION

According to the present invention, an execution flow is created for each swimlane describing service functions, with input and output interface elements added in accordance with a selected service interface model so as to implement interactions between swimlanes. The resulting function-specific execution flows are deployed on servers, with matched input and output interfaces, so that the servers can provide the intended services by communicating correctly with each other.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for supporting implementation of business-specific service functions on a computer system, the program causing a computer to function as:

a service interface selector that determines which service interface should be used to implement interactions between swimlanes representing individual services constituting a given business process model; and an execution flow generator that:

creates an initial version of execution flows each corresponding to the individual services and places functional elements of each swimlane in the corresponding execution flow, as well as adding input and output interfaces between different swimlanes according to the service interface chosen by the service interface selector, expands the given business process model by adding an input interface to accept invocation from other services, and an output interface to invoke other services, and selects, according to the selected service interface, functional elements corresponding to the input and output interfaces in the expanded business process model and places the selected functional elements in the execution flows corresponding to the services that interact with each other.

2. The computer-readable medium according to claim 1, wherein:

the computer system includes a plurality of servers; and the program further causes the computer to function as a service deployment unit that deploys the execution flows on the servers to provide the services according to the corresponding execution flows.

3. The computer-readable medium according to claim 1, wherein the service interface selector selects a service interface using synchronous messaging to organize services or another service interface using asynchronous messaging to organize services.

4. The computer-readable medium according to claim 1, wherein:

the service interface selector selects a centralized management model or an individual service model;

the centralized management model permits one particular service to invoke other services; and the individual service model permits a service to invoke other services directly associated with the invoking service.

5. The computer-readable medium according to claim 1, wherein the service interface selector is allowed to select a different service interface for each pair of directly associated services.

6. The computer-readable medium according to claim 1, wherein the service interface selector selects a remote procedure call (RPC) service interface for services to be invoked by a service needing a reply, while selecting an asynchronous messaging service interface for the other services.

7. The computer-readable medium according to claim 1, wherein the interaction model selector selects a synchronous service interface for invocation from a service that has been invoked by using a synchronous service interface.

8. The computer-readable medium according to claim 1, wherein the execution flow generator skips creating execution flows for an existing service and incorporates the existing service in the execution flow of a destination service.

9. A computer-implemented method for supporting implementation of business-specific service functions on a computer system, the method comprising:

determining which service interface should be used to implement interactions between swimlanes representing individual services constituting a given business process model;

creating an initial version of execution flows each corresponding to the individual services;

expanding the given business process model by adding an input interface to accept invocation from other services, as well as an output interface to invoke other services;

selecting, according to the selected service interface, functional elements corresponding to the input and output interfaces in the expanded business process model and places the selected functional elements in the execution flows corresponding to the services that interact with each other;

placing functional elements of each swimlane in the corresponding execution flow; and adding input and output interfaces between different swimlanes according to the determined service interface.

10. A service implementation support device for supporting implementation of business-specific service functions on a computer system, the device comprising:

a service interface selector that determines which service interface should be used to implement interactions between swimlanes representing individual services constituting a given business process model; and an execution flow generator that:

creates an initial version of execution flows each corresponding to the individual services and places functional elements of each swimlane in the corresponding execution flow, as well as adding input and output interfaces between different swimlanes according to the service interface chosen by the service interface selector, expands the given business process model by adding an input interface to accept invocation from other services, as well as an output interface to invoke other services, and selects, according to the selected service interface, functional elements corresponding to the input and output interfaces in the expanded business process model and places the selected functional elements in the execution flows corresponding to the services that interact with each other.

11. A computer-implemented method for supporting implementation of business-specific service functions on a computer system, the method comprising:

adding an input interface to a business model to accept invocation from other services, as well as an output interface to invoke other services; and selecting, according to a selected service interface, elements corresponding to input and output interfaces in the business model and placing the selected elements in execution flows corresponding to services that interact with each other.

* * * * *